US012248351B2

(12) United States Patent
Cooper et al.

(10) Patent No.: US 12,248,351 B2
(45) Date of Patent: Mar. 11, 2025

(54) POWER GOVERNANCE OF PROCESSING UNIT

(71) Applicant: Tahoe Research, Ltd., Dublin (IE)

(72) Inventors: Barnes Cooper, Hillsboro, OR (US); Harinarayanan Seshadri, Bangalore (IN); Rajeev Muralidhar, Bangalore (IN); Noor Mubeen, Bangalore (IN)

(73) Assignee: Tahoe Research, Ltd., Dublin (IE)

(*) Notice: Subject to any disclaimer, the term of this patent is extended or adjusted under 35 U.S.C. 154(b) by 0 days.

(21) Appl. No.: 18/180,462

(22) Filed: Mar. 8, 2023

(65) Prior Publication Data

US 2023/0221786 A1    Jul. 13, 2023

Related U.S. Application Data

(63) Continuation of application No. 17/481,232, filed on Sep. 21, 2021, now Pat. No. 11,604,504, which is a continuation of application No. 16/650,782, filed as application No. PCT/US2017/066813 on Dec. 15, 2017, now Pat. No. 11,132,046.

(51) Int. Cl.
| G06F 1/32 | (2019.01) |
| G06F 1/3228 | (2019.01) |
| G06F 1/329 | (2019.01) |
| G06F 1/3296 | (2019.01) |

(52) U.S. Cl.
CPC .......... *G06F 1/3228* (2013.01); *G06F 1/329* (2013.01); *G06F 1/3296* (2013.01)

(58) Field of Classification Search
CPC ....... G06F 1/3228; G06F 1/329; G06F 1/3296
See application file for complete search history.

(56) References Cited

U.S. PATENT DOCUMENTS

| 7,861,102 B1 | 12/2010 | Ranganathan et al. |
| 8,015,423 B1 | 9/2011 | Satterfield et al. |
| 8,527,801 B2 | 9/2013 | Brock et al. |

(Continued)

OTHER PUBLICATIONS

International Search Report and Written Opinion dated Sep. 17, 2018 from International Patent Application No. PCT/US2017/066813, 15 pages.

(Continued)

*Primary Examiner* — Stefan Stoynov
(74) *Attorney, Agent, or Firm* — Studebaker & Brackett PC

(57) ABSTRACT

Power governance circuitry is provided to control a performance level of a processing unit of a processing platform. The power governance circuitry comprises measurement circuitry to measure a current utilization of the processing unit at a current operating frequency and to determine any change in utilization or power and frequency control circuitry is provided to update the current operating frequency to a new operating frequency by determining a new target quantified power expenditure to be applied in a subsequent processing cycle depending on the determination of any change in utilization or power. A new operating frequency is selected to satisfy the new target quantified power based on a scalability function specifying a variation of a given value of utilization or power with the operating frequency. A processing platform and machine readable instructions are provided to set a new quantified target power of a processing unit.

4 Claims, 9 Drawing Sheets

(56) References Cited

U.S. PATENT DOCUMENTS

| | | |
|---|---|---|
| 9,086,823 B2 | 7/2015 | Werner |
| 9,329,663 B2 | 5/2016 | Jane et al. |
| 10,417,054 B2 | 9/2019 | Andrus et al. |
| 2006/0031691 A1 | 2/2006 | Bacchus et al. |
| 2007/0016815 A1* | 1/2007 | Cooper ................. G06F 1/3203 713/322 |
| 2008/0201591 A1* | 8/2008 | Hu ........................ G06F 1/3203 713/323 |
| 2011/0022876 A1 | 1/2011 | Sasaki |
| 2011/0113269 A1 | 5/2011 | Park |
| 2012/0185709 A1 | 7/2012 | Weissmann et al. |
| 2013/0046967 A1 | 2/2013 | Fullerton et al. |
| 2014/0380076 A1 | 12/2014 | Weissmann et al. |
| 2016/0034013 A1 | 2/2016 | Kim et al. |
| 2016/0077569 A1 | 3/2016 | Aizik et al. |

OTHER PUBLICATIONS

Notice of Allowance issued Jun. 2, 2021 for U.S. Appl. No. 16/650,782, 11 pages.

\* cited by examiner

| Step | Description | CPU | GPU | IPU |
|---|---|---|---|---|
| | For each polling interval, do the following | 15ms | 100ms | 100ms |
| Step 1 | Check current utilization | ΔMPERF/ΔTSC | ΔGT_BUSY/ΔSC_CPU | • No clear arch support in current IPUs<br>• Driver heuristics currently used |
| Step 2 | Check current scalability | (ΔAPERF/ΔMPERF)*ΔTSC | | • No arch support in current IPUs |
| Step 3 | Evaluate:<br>a. If Δutil<threshold, do nothing (does not require P-state change)<br><br>b. If Δutil>threshold, find new P-state<br><br>c. Check current_power (from power profile)<br><br>d. For new freq f_new, determine resulting scalability and power | a. Compute Pstate_Set = {P1, P2,...,Pn}<br>b. where: Px = {load_new, scalability_new, power_new}<br>c. Each element in Pstate_set is a possible new P-state | Same as CPU but use different equations, power models, scalability, utilizations | Currently driver may use utilization-based heuristics to scale frequencies for Input Subsystem and Processing Subsystem. IS and PS frequencies can be controlled separately but PUNIT firmware may control final frequency granted.<br><br>Alternative example is to implement the same governance logic in IPU as in the CPU |
| Step 4 | Select an energy-efficient (e.g. optimal) frequency | Select P-state from Pstate_set<br>If EPP < 50 (performance mode)<br>if EPP> 50 (power mode)<br>-Select P-state with lowest power | Similar to CPU<br>- Additionally if util>97% of threshold, set to Gfx Turbo (high performance mode) | Similar to CPU.<br><br>Can additionally treat IS and PS as separate IPs |

*FIG. 7*

POWER GOVERNANCE OF PROCESSING UNIT

CROSS REFERENCE TO RELATED APPLICATIONS

The present application is a continuation of U.S. application Ser. No. 17/481,232 filed Sep. 21, 2021, which is a continuation of U.S. application Ser. No. 16/650,782, filed Mar. 25, 2020, entitled "POWER GOVERNANCE OF PROCESSING UNIT," and issued as U.S. Pat. No. 11,132,046 on Sep. 28, 2021, which is a national phase entry under 35 U.S.C. § 371 of International Application No. PCT/US2017/066813, filed Dec. 15, 2017, entitled "POWER GOVERNANCE OF PROCESSING UNIT," which designated, among the various States, the United States of America, the entire contents of which are incorporated herein by reference.

TECHNICAL FIELD

Embodiments described herein generally relate to the field of power governance, and more particularly, to power governance of processing units to control a performance level of a processing platform.

BACKGROUND

Processors have dynamically changing power requirements depending on processing application (workload) demands. A number of different performance states of a processor may be implemented, for example, by selecting an execution frequency, f, and a corresponding processor core voltage, V. Processor power consumption, P, may be approximated as, $P=f*V^2*C+\text{leakage}$, where C is capacitance. The leakage is approximately a constant corresponding to power wasted as a result of applying a voltage to a transistor. Thus, the processor frequency and voltage may be increased when processing workload is high to run faster and this results in increased power consumption, whilst processor frequency and voltage may be reduced when the processor has a low workload or is idle to reduce power consumption. The processor performance level may be set based on both processing workload and a maximum capacity of an available power supply.

On current processing platforms, active power management is performed by dynamically scaling at least one of voltage and frequency, a technique known as Dynamic Voltage and Frequency Scaling (DVFS). The DVFS may be performed when processors demand higher (or lower) performance states and may be based on changes in processor utilization. Higher performance states (higher frequency states) are often granted by a DVFS controller unless there is some other constraint or limit that mitigates against the higher frequency choice, such as detection of thermal violations or peak current violations during processing.

As processing platforms evolve, form factors of integrated circuits such as Systems On Chip (SOCs) are shrinking into more power-constrained and thermally-constrained designs. Current platforms tend to detect power limits being exceeded or approached and to respond by reactively throttling the processor performance level to bring the platform back into a desirable operating state. Performing such throttling may adversely affect processing performance if it is performed too frequently. In some cases, a reactive response to a power limit being breached may not provide enough warning to enable the processing platform to reliably prevent inadvertent system failure. Furthermore, dispensing frequency to a processor based on utilization alone may not be energy-efficient for all processing tasks, for example, where processing speed is reduced due to latency of accessing data in memory. There are some instances when it may be appropriate to be more permissive in dispensing higher frequency as the utilization level demands and other instances when it may be appropriate to be more conservative in dispensing frequency to be more energy efficient.

BRIEF DESCRIPTION OF THE DRAWINGS

Embodiments described herein are illustrated by way of example, and not by way of limitation, in the figures of the accompanying drawings in which like reference numerals refer to similar elements:

FIG. 7 is a table listing a sequence of processing elements to implement power governance for processing units.

DESCRIPTION OF EMBODIMENTS

Illustrative embodiments of the present disclosure include, but are not limited to, methods, systems and apparatuses and machine-readable instructions for peak power determination in integrated circuit devices.

Figure 1:
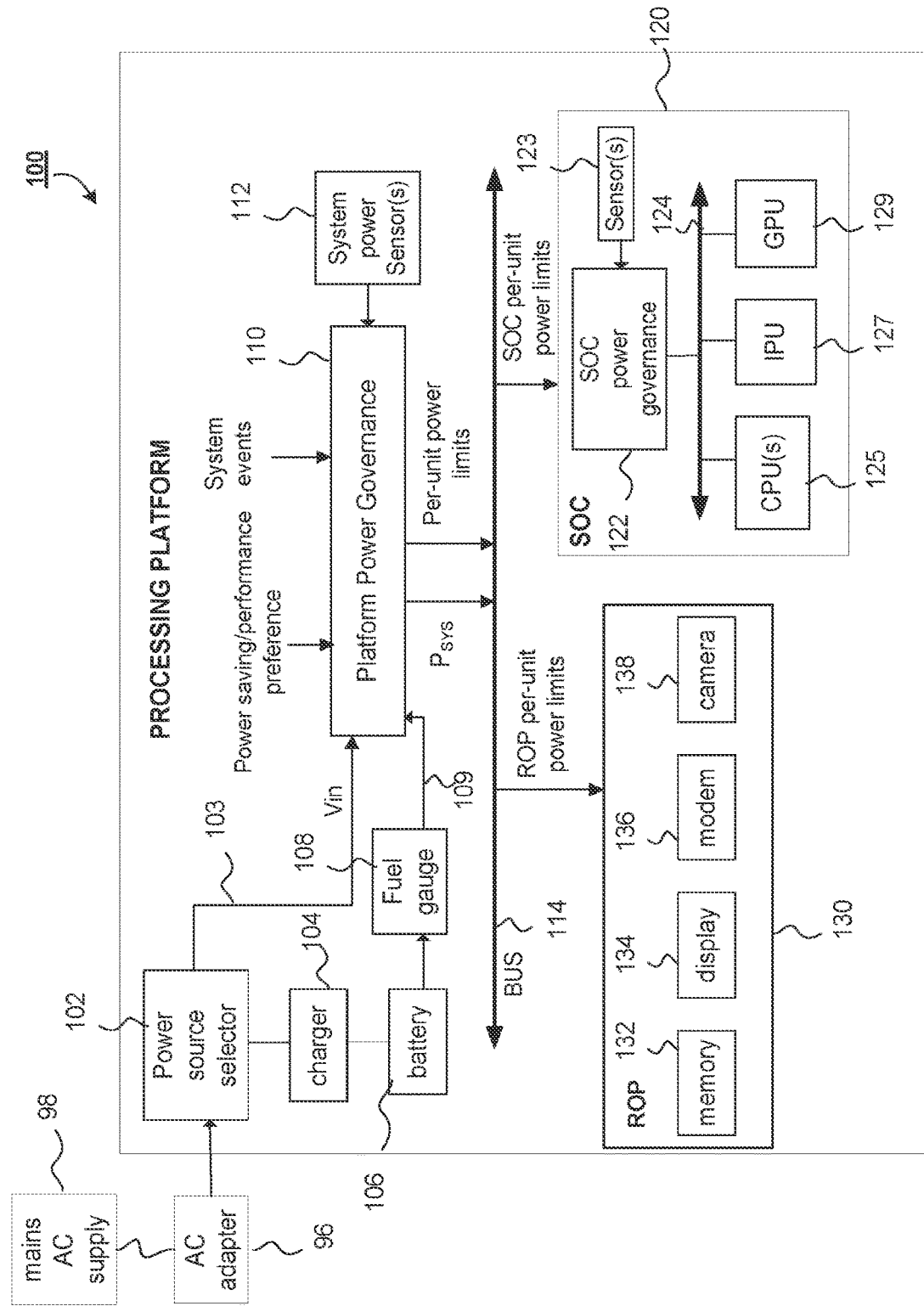
FIG. 1 schematically illustrates a processing platform having platform-level power governance circuitry and SOC-level power governance circuitry.

FIG. 1 schematically illustrates a processing platform 100 having platform-level power governance circuitry 110 and SOC-level power governance circuitry 122 capable of controlling power to one or more individual processing units of a SOC 120. The processing platform 100 comprises a power source selector 102, a charger 104, a battery 106, a fuel gauge 108, the platform-level power governance circuitry 110 and one or more system power sensors 112. A system bus 114 provides a communication path between the platform-level power balancing circuitry 110 and the SOC 120 and a Rest-of-Platform (ROP) 130 representing a set of system components other than the SOC 120 to which the platform-level power balancer 110 controls power from an available power supply.

The ROP 130 in this example comprises a memory 132, a display 134, a modem 136 and a camera 138. The SOC 120 comprises a set of SOC power governance circuitry 122, one or more SO-based sensors 123, a SOC bus 124, a Central Processing Unit (CPU) 125 comprising one or more physical processing cores (not shown), an Image Processing Unit (IPU) 127 and a Graphics Processing Unit (GPU) 129.

The IPU 127 may be an imaging subsystem to process camera images from a camera integral to an electronic device. The IPU 127 may comprise a sensor and camera control chipset and an image signal processor. The IPU 127 may support image capture, video capture, face detection and image processing capabilities. The GPU 129 is a specialized highly parallel processing unit that uses a frame buffer and memory manipulation to process blocks of data to accelerate computer graphics and image processing. The GPU 129 may comprise a plurality of execution units (EUs), each comprising at least one floating point unit (FPU).

The power source selector 102 may select an AC adapter 96 that performs Alternating Current (AC) to Direct Current (DC) conversion on power from a mains AC supply 96 to supply power to the processing platform 100. However, when mains power is unavailable, the power source selector 102 may select the battery 106 of the processing platform 100 to supply power to the SOC 120 and the ROP 130. If the battery 106 is not fully charged then the AC adapter may be controlled by the power source selector 102 to supply power to increase a charge level of the battery 106 as well as supplying power to the SOC 130 and the ROP 130.

The fuel gauge 108 may be used to determine at least a battery power and a battery current, for example, by using a coulomb gauge or a sense resistor to monitor a total quantity of charge either supplied to the battery in a charge cycle or received form the battery in a discharge cycle. The fuel gauge may provide an indication of at least one of a battery charge level and a full battery capacity in dimensioned units such as Coulombs or Ampere hours. The full battery capacity may decline in value over a battery lifetime due to effects of multiple charge-discharge cycles. The fuel gauge may thus provide an indication of a peak power capacity of the battery 106 at a given time, which may depend on calibration of the battery and a battery charge level at the given time.

The platform power governance circuitry 110 may be coupled to the one or more sensors 112 to receive information indicating a status of the one or more sensors 112. The sensors 112 may be provided proximate to components of the system such as proximate to the battery 106 or power source selector 102 or proximate to interconnections such as the bus 114 or any other component associated with the processing platform 100. The SOC sensors 123 may be provided proximate to one or more of the CPU 125, the IPU 127, the GPU 129 and the bus 124. The sensors 112, 123 may provide measurements of, for example, battery charge levels, battery current values, adapter current values, temperature, operating voltage, operating current, operating power, inter-core communication activity, operating frequency or any other parameter relevant to power or thermal management of the processing platform 100.

The SOC 120 of FIG. 1 may receive a system power signal, $P_{SYS}$, 111 from the platform-level power balancing circuitry 110 via the system bus 114 and may use the $P_{SYS}$ signal 111 to monitor when the system power satisfies one or more threshold conditions including a peak power threshold condition. The threshold conditions may relate to average power limits or to instantaneous power limits of the processing platform 100. The threshold conditions may relate to a minimum value for $V_{SYS}$ below which system failure is likely to occur or to a maximum value of $P_{SYS}$ (or corresponding current $I_{SYS}$ or voltage $V_{SYS}$), above which system failure is likely to occur. A threshold voltage $V_{TH}$ and the maximum permissible system power $P_{MAX\_SYS}$ and maximum permissible system current $I_{MAX}$ or voltage $V_{MAX}$ for the SOC may be set by the SOC power governance circuitry 122, for example by software in the SOC based on information from the platform-level power governance circuitry 110. In other examples, these power limit parameters for the SOC 120 may be set by an embedded controller (not shown) on the processing platform. $V_{TH}$ may depend on a minimum system voltage $V_{MIN}$ set once by the user. Thus $V_{TH}$ is likely to be higher than $V_{MIN}$. Triggering of assertion of the throttling signal may depend on one or more of the values $V_{TH}$, $I_{MAX}$ and $P_{SYS\_MAX}$.

Further power control signals may be sent to the SOC 120 via the system bus 114 depending, for example, on thermal limits of the processing units based on feedback from at least one of the system sensors 112 and the SOC sensors 123. For example, the SOC sensors 123 may feedback temperature and power consumption measurements from the processing units 125, 127, 129 to the platform power governance circuitry 110 via the bus 114. Power control to activate a power reducing feature of the SOC 250 may be performed by the SOC power governance circuitry 122 depending on a count of how many times the system signal has satisfied the respective threshold condition.

The SOC 120 may be responsive to assertion of a throttling signal (not shown) to activate a power reducing feature of the SOC. For example, power consumption may be reduced in response to a throttling signal from one of the platform power governance circuitry 110 and the SOC power governance circuitry 122, the throttling signal to result in reducing a processor frequency within a predictable time window $\Delta t_1$, of the throttling signal being asserted. The power reducing feature in some examples is implemented by the power governance circuitry 110, 122 either reactively to respond to a threshold being crossed or preemptively to prevent a threshold being crossed. Some power thresholds may relate to average power indicators whereas other power thresholds may relate to instantaneous power characteristics associated with "spikes" in processing activity.

The platform power governance circuitry 110 may deal with thresholds applicable to the platform as a whole, including the SOC 122 and the ROP 130. For example, the platform power governance circuitry 110 may ensure that a total power drawn by the ROP 130 and the SOC 120 does not exceed a maximum system power $P_{SYS}$ currently available from the selected power source. The maximum power available may change, for example, as the charge level of the battery 106 depletes. The platform power governance circuitry 110 may receive an input voltage 103 from the power source selector, an indication of a battery charge level via a signal 109 from the fuel gauge 108, an indication of a user preference denoted an EPP (Energy Performance Preference) indicating if a power saving mode or a performance enhancing mode is currently selected and an indication of system events such as docking and undocking of the processing platform 100 from a docking station that connects it to the mains AC supply 98. The EPP may be provided by an operating system or may be a user-programmable value.

The platform power governance circuitry 110 may also receive one or more weights to provide guidance with regard to how the available system power $P_{SYS}$ should be apportioned between at least a subset of different processing units 125, 127, 129 of the SOC and different components 132, 134, 136, 138 of the ROP 130. In some embodiments, the processing platform 100 may comprise only the SOC 120 and no ROP 130 components. As well as controlling power drawn by platform components so that it does not exceed $P_{SYS}$, the platform power governance circuitry 110 may ensure proper thermal management of the processing platform 100 to maintain conformity with any power dissipation and junction temperature operating condition limits associated with processing units such as the CPU(s) 125. Operating the CPU(s) 125 within thermal and any other design limits can prevent inadvertent damage to the CPU(s) 125 and other components of the platform 100. At least one of the platform power governance circuitry 110 and the SOC power governance circuitry 122 may implement one or more power limits, such as a first power limit, PL1, providing a threshold for average power of the platform 100 that may be sustainable indefinitely. The value of PL1 may be set at or close to thermal design limits of the processing platform. A second power limit, PL2, may be a higher power limit than PL1, which could be sustained for up to a limited duration such as, for example, 100 seconds.

A number of different performance parameters maybe used to monitor performance of a processing unit. For example, a "utilization" of a processing unit may refer to a proportion of the total available processing cycles when the processing unit (which may comprise multiple physical cores) is in an active state rather than in a sleep state or in a power saving mode or in an off state. The utilization is sometimes denoted "load", although this "load" is different from a workload (a processing task comprising instructions to execute). A workload upon execution by a given processing unit may result in a corresponding utilization of the processing unit and a corresponding scalability, where the scalability reflects a time taken to complete execution of the workload which is likely to vary depending on stalls and such like. Instantaneous measurements of utilization and scalability of a given workload may vary during the execution time. In a sleep state, power consumption is reduced by suspending processing but retaining some power so that "wake-up" is more rapid than it would be from a power off state. A processing unit may provide a number of different power states even in an active mode, but an active state refers to the processor state being fully on and the system clocks being on. The active state is a normal state of a physical core when code is being executed. For multi-threaded operation, if any thread in a processor core is active then the state of the core should be resolved to be active. In "sleep" states the processor state is not fully on, but the system clocks are on. Processor performance levels may be controlled via an operating system or via dedicated or special purpose hardware or using a combination of hardware and software. The platform power governance circuitry 110 may take into account one or more of: processing workload demand (for example, a type of program application being executed), thermal limits of processing hardware, maximum power, voltage, frequency and current levels and an activity window of performance requested by an operating system.

A "scalability" of a processing unit may refer to how an execution time of a given processing workload of a processing unit may change with the operating frequency. A workload resulting in many stalls, for example, may be less scalable than a workload resulting in few stalls. The stalls may occur, for example, due to a dependency on data being returned from memory. Thus the utilization may provide a measure of when a processing unit is active, whereas scalability may provide a measure of useful (stall-free) work done when the processor is active. It will be appreciated that increasing a processing frequency when scalability is low is likely to result in less of an increase in the rate of workload throughput than when the scalability is high. This is because stalls such as memory-dependent stalls are not ameliorated by increasing the frequency of the processing unit because the stall time is not an explicit function of the processing unit execution clock rate.

In previously known systems, selection of performance levels of processing units such as operating frequency selection were based on system power thresholds and may have taken into account processing unit utilization and processing unit scalability in order to dispense a new frequency when selecting a new performance level. However, the power impact of new frequency choice was not evaluated prior to setting the new frequency, but power may have been throttled to a lower value in response to a throttling signal. By way of contrast, according to the present technique a power impact of each frequency choice is evaluated by at least one of the platform power governance circuitry 110 and the SOC power governance circuitry 122 before the frequency is dispensed to the corresponding processing unit(s). Thus, according to example embodiments, individual power limits may be dispensed to each of at least a subset of the ROP components 132, 134, 136, 138 and the SOC components 125, 127, 129. The unit-based power limits may apply to each of or at least a subset of: the memory 132, the display 134, the modem 136, the camera 138, the CPU(s) 125, the IPU 127 and the GPU 129. Some units may have more than one associated frequency of operation influencing a performance level of the unit. For example, the IPU 127 may have an input subsystem frequency and a processing subsystem frequency, which may be separately controlled. The CPU(s) may comprise a plurality of physical cores. The unit-based power limits may be set depending on utilization measurements of the processing units. Each processing unit may have an associated weighting used to apportion the system power between a plurality of processing units. The unit-based power limits may be dynamically updated by the processing platform.

Power saving strategies may be implemented by the ROP 130 components to respect any per-unit power limits received from the platform power governance circuitry 110. For example, the memory 132 may be put in a self-refresh state, the display 134 may reduce memory reads when performing display refresh or may adapt a backlight brightness or vary a refresh rate depending on a media type being displayed.

In a multi-core processor, all active processor cores may share the same frequency and voltage by selecting, for example, a highest frequency performance state requested amongst all of the active cores as the frequency to allocate. The CPU(s) 125 may have multiple performance operating points having associated frequency and voltage parameters. An operating point may be selected to prioritize power efficiency or performance depending on a value of the EPP parameter. Frequency selection may be software controlled by writing to CPU register(s). An operating voltage may then be selected, in the case of the CPU(s) 125, depending on the selected frequency and a number of active physical cores. Due to a low transition latency between performance states, multiple performance level transitions per second are possible for each processing unit.

The GPU 129 may have a driver to dynamically adjust between performance states to maintain performance, power and thermal constraints. The voltage of the GPU 129 may be adjusted down to place it in a sleep state. A frame-rate may be limited to reduce a load on the GPU 129 and allow it to be run at lower speeds to make power savings. Thus the GPU 129 may be controlled by the SOC power governance circuitry 122 to operate within a power limit allocated by the platform power governance circuitry 110 based on an apportionment of the system power $P_{SYS}$ between the processing units of the processing platform 100.

In some previously known systems, allocation of an operating frequency to a CPU may have been controlled according to a DVFS algorithm arranged to monitor processor core utilization and scalability at regular intervals, for example, around every millisecond and to apply averaging to the measured quantities. Any other DVFS capable platform components such as the IPU 127 and GPU 129 may have sent their frequency requests to the CPU power governance algorithm. In previously known systems, processing units other than the CPU did not perform power-aware governance for the respective processing unit although a frequency request could be made. This is because there has been a strong focus on governance having a focus on performance without due consideration of the power impact of performance-based tuning. An operating frequency for the CPU may have been selected based on observed changes in utilization and scalability. A performance state may have been determined using a ratio of CPU power to system power $P_{SYS}$, but also by considering power from all platform components other than the CPU as a static SOC power. A high frequency performance level or boosted performance level known as a "turbo frequency" may have been allocated depending on a utilization threshold being exceeded. The system may have responded to higher than desirable power consumption corresponding to, for example, a thermal warning being triggered or a peak current violation, to reactively reduce power consumption by decreasing operating frequencies of processing units to reduce the power consumption to a desirable level.

In such previously known systems, a power governor algorithm for the CPU may have been a centralized arbiter and controller for granting frequency to other processing units such as the IPU 127 and the GPU 129. By way of contrast, according to the present technique, each DVFS capable processing unit may have a unit-specific algorithm to perform power governance to enable power-aware frequency allocation of the respective unit. In some example embodiments, only the CPU and a subset comprising one or more of the other processing units of the platform 100 may have individual power-aware governance algorithms. Distributing power-aware governance between two or more processing units is more scalable to different platform architectures than the previously known CPU-centric power governance approaches. The distributed power-aware governance of example embodiments allows performance level preferences that distinguish between power efficiency and performance enhancement to be input to each processing unit 125, 127, 129, rather than just to the CPU 125. Furthermore, thermal limits and peak current, voltage and power consumption limits can be provided to the governance logic for each processing unit. This allows more effective and efficient performance level selection and power efficiency to be implemented.

In some examples, the processing platform 100 may represent an appropriate computing device, such as a computing tablet, a mobile phone or smart-phone, a laptop, a desktop, an Internet of Things (IOT) device, a server, a set-top box, a wireless-enabled e-reader, or the like.

Figure 2A:
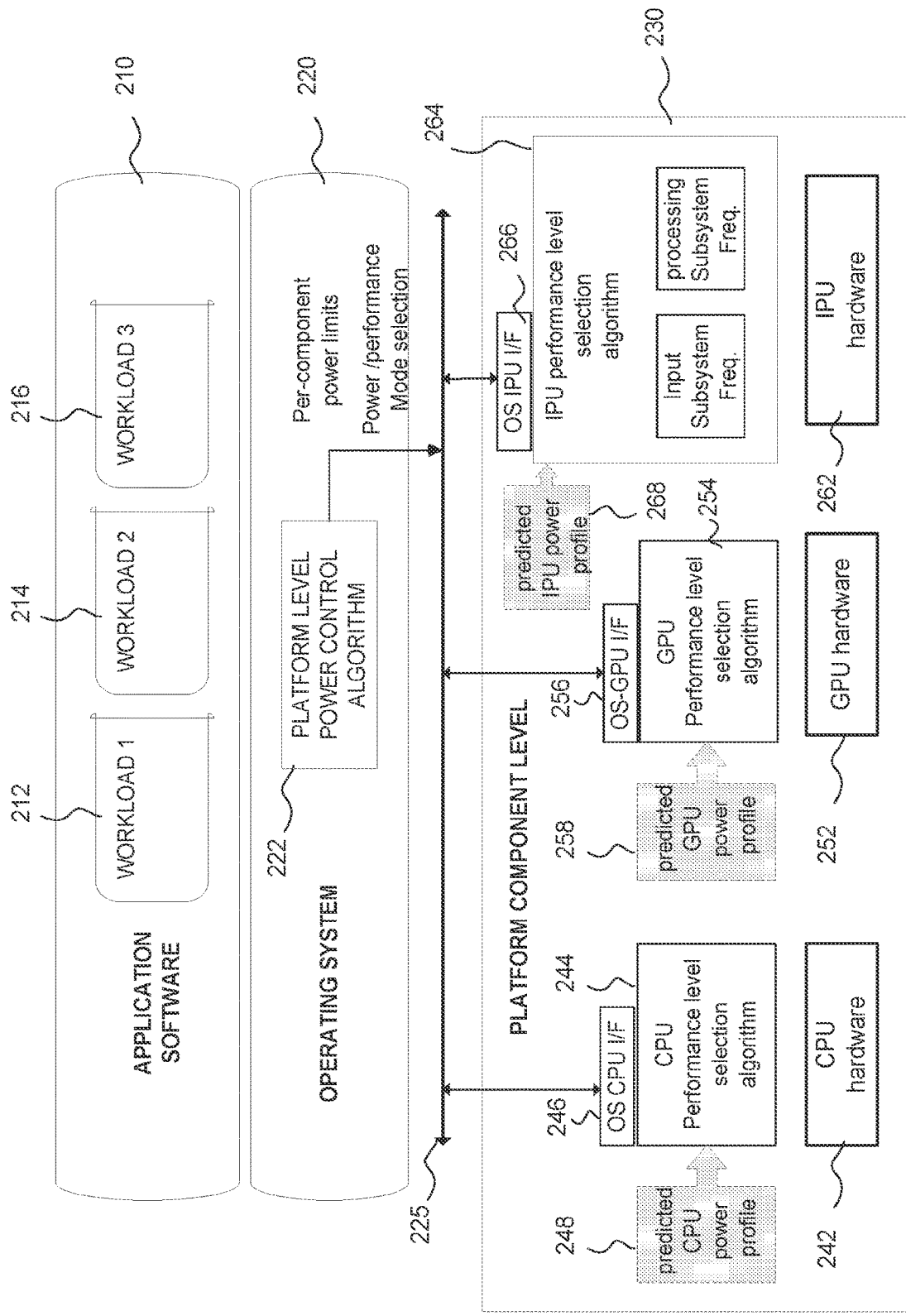
FIG. 2A schematically illustrates a software stack applicable to power governance that is distributed between a plurality of processing units.

FIG. 2A schematically illustrates a software stack applicable to power governance that is distributed between a plurality of processing units. The software stack comprises an application software layer 210, an operating system layer 220 and a platform component layer 230. The application software layer comprises a first workload 212, a second workload 214 and a third workload 216. The first workload 212 may be a video editing application, the second workload 214 may be a Deoxyribonucleic acid (DNA) sequencing application 214 and the third workload 216 may be a gaming application. The different processing workloads 212, 214, 216 may place different processing demands on the processing units of the platform component level 230, the processing units comprising CPU hardware 242, GPU hardware 252 and IPU hardware 262. For example, the gaming application 216 is likely to result in proportionally more power consumption by the GPU hardware 252 than by the CPU hardware 242 whereas the DNA sequencing application 214 is likely to result in more power being consumed by the CPU hardware 242 than the GPU hardware 252.

According to the present technique, a power-impact of candidate target frequency selections for each set of processing hardware 242, 252, 262 may be taken into account before those frequencies are allocated. The different processing workloads 212, 214, 216 may result in different utilization levels and different scalability levels and those levels may also vary for each set of hardware 242, 252, 262.

According to the present technique, the operating system level 220 of the software stack may have a platform level power control algorithm 222, which may allocate per-component power limits to each of at least a subset of the CPU hardware 242, the GPU hardware 252 and the IPU hardware 262 via a bus 225. The per-component power limits may be set by the platform level power control algorithm 222 based on one or more constraints such as an available system power $P_{SYS}$ and may take into account one or more of: threshold temperatures, threshold currents and threshold voltages of the platform hardware. The platform level power control algorithm 222 may also supply a mode selection parameter applicable globally to the platform components or to a subset of components or to individual components, to select between optimization (or at least improvement of) either processing performance (throughput) or power efficiency.

At the platform component level 230 of the software stack, the CPU hardware 242 has a corresponding CPU performance level selection algorithm 244, which has an interface 246 to the platform level power control algorithm 222. The CPU performance level selection algorithm 244 takes as input a predicted CPU power profile 248, which it uses to make predictions about power usage for different candidate frequencies before allocating a frequency to the CPU hardware 242. Similarly, the GPU hardware 252 has a corresponding GPU performance level selection algorithm 254, which has an operating system (OS) GPU interface 256 to the platform level power control algorithm 222. The GPU performance level selection algorithm 254 takes as input a predicted GPU power profile 248, which it uses to make predictions about power usage for different candidate frequencies before allocating a frequency to the GPU hardware 252. Likewise, the IPU hardware 262 has a corresponding IPU performance level selection algorithm 254, which has an operating system (OS) IPU interface 266 to the platform level power control algorithm 222. The IPU performance level selection algorithm 264 takes as input a predicted IPU power profile 268, which it uses to make predictions about power usage for each of an input subsystem frequency 265a and a processing subsystem frequency 265b before allocating a frequency to the IPU hardware 262.

The OS CPU interface 246, the OS-GPU interface 256 and the OS IPU interface 266 allow for performance level selection algorithms and circuitry in the individual processing units to receive system parameters to feed into processing unit frequency selections and allow the individual processing units to feedback power expenditure information (e.g. a new target quantified power expenditure) associated with frequency selections to the platform level power control algorithm 222. The replication of generic performance level selection algorithms 244, 254, 264 in multiple processing units and an ability to perform power-aware frequency allocation in the individual processing units enables distributed control efficiency and an ability to readily determine a performance per Watt for each performance level selection decision.

Each of the CPU performance level selection algorithm 244, the GPU performance level selection algorithm 254 and the IPU performance level selection algorithm 264 receives from the platform level power control algorithm 222 a respective predicted unit-specific power profile 248, 258, 268. Each of the three performance-level selection algorithms may also receive, a unit-specific scalability value and a unit-specific utilization value from hardware counters as outlined in Tables 1 and 2 below. Each unit-specific power profile 248, 258, 268 may provide an "a prori" relationship (e.g. determined, for example, pre-runtime or even from a processor model prior to fabrication) between utilization, frequency and power for the given unit. The power profiles for each of the CPU, GPU or IPU may be based on a pre-silicon model or based on post-silicon measured data or based on synthetic workloads. A pre-silicon model may be a pre-fabrication or processor design simulation based model. Some power models may assume a power virus, which means a 100% utilization. Other power models may assume specific workloads with corresponding processor dynamic capacitance (Cdyn). The equation $P=Cdyn*V^2*f$ may be used to determine Cdyn where P is power drawn, V is voltage and f is an operating frequency of the given processing unit. The value of Cdyn is workload-dependent so it may vary based on processor utilization and scalability. The power profile for a given processing unit may be generated in any one of a number of different ways, but however generated, the predicted power profile is used to generate the following processing unit governance equations:

1) power as a function of frequency and utilization,
2) frequency as a function of utilization and power and
3) utilization as a function of power and frequency The above three metrics may be used without also having a governance equation(s) involving scalability. Scalability is an inherent attribute of the workload; more specifically, how the workload impacts the processing unit, or CPU execution pipeline for example. Since it may be impractical to analytically model a large range of different workloads, it is useful to base the governance algorithms on utilization, frequency and power as opposed to scalability. While the equations may not be 100% accurate for all possible Cdyn for the processing units (platform components) across different workloads, they are sufficiently accurate nevertheless, to determine a general trend of the power consumption of the given processing unit to enable more efficient and effective performance governance to be performed.

Each of the CPU performance level selection algorithm 244, the GPU performance level selection algorithm 254 and the IPU performance level selection algorithm 264 may have three different categories of potential input. These three categories are: (i) system level inputs; (ii) utilization inputs specific to each processing unit; and (iii) scalability inputs specific to each processing unit. The system level inputs may comprise power limits such as a first power limit "PL1" and a second power limit "PL2", thermal limits and energy performance preference information. These system level inputs provide centralized guidance from the platform (system) level allowing each of the processing units such as the CPU hardware 242, the GPU hardware 252 and the IPU hardware 262 to operate to some extent autonomously. The energy performance preference information may be, for example, platform-wide or unit specific or component-specific or SOC-specific. A platform wide energy performance preference may be used to guide each of the individual performance level selection algorithms 244, 254, 264. The utilization inputs may differ between processing units. For example, the CPU hardware 242 and the GPU hardware 252 may each have their own metrics for measuring current utilization. According to the present technique, each processing unit may expose a current utilization value in an architecturally consistent way.

For example, CPU utilization may be measured using a number of performance monitor counters, whose values may be stored in registers, the counters comprising:

reference counter ("MPERF"): a running counter for activity that counts at a fixed TimeStamp Counter (TSC) clock rate and counts only during active state of the CPU (when at least one physical core is active in a multi-core system). The TSC clock rate typically corresponds to a guaranteed base frequency of the CPU in the active state or some other baseline counter that increments (or decrements in other examples) at a constant time interval.

an execution counter ("APERF"): a running counter for activity that counts at actual clock rate of execution at that instant. This actual clock frequency may vary over time based on performance level governance and/or other algorithms. This register counts only during an active state.

A useful work counter ("PPERF"): a running counter for activity that counts at an actual clock rate, similar to APERF, except that it does not count when activity "stalls" due to some dependency. One example of such a dependency is when the CPU is gated on a clock domain of another platform component such as memory.

Using the above CPU performance counters, a CPU utilization and a CPU scaling factor may be defined as follows:

$$\text{Utilization:} U = (\Delta APERF/\Delta MPERF)*\Delta TSC \quad \text{eqn. 1.1}$$

$$\text{Scaling factor:} S = \Delta PPERF/\Delta APERF \quad \text{eqn. 2.1}$$

Where the symbol "Δ" represents a change in the respective count value in a given count sampling interval, $T_z$. The value TSC is the time interval between counter increments (or decrements) of the baseline counter. Utilization essentially represents the "work" done since APERF is a free running counter that runs at the current frequency, thus representing how active the CPU was and MPERF is a free running counter at a fixed frequency. Note that if execution of program instructions by the CPU is free of stalls then PPERF=APERF and thus the scaling factor is equal to one. In such a situation, a time taken to complete each processing activity in a given time window is simply an inverse of the actual frequency in that window. However, in practice the scaling factor for real-life workloads may be less than 1. Typical values may be in the range of 0.75 to 0.95, although values outside that range are not uncommon.

Note that although the utilization eqn. 1.1 does not involve the stall-free activity count ΔPPERF, the utilization does take into account the scalability and the effect or stalls in processing. This can be understood by considering that utilization is "work" done, which means, that the CPU was in an active state doing some "work", rather than in an idle or a sleep state or another low power state, for example. This could be "pure work", for example, purely CPU computations. However, this work might also include time when the CPU was busy doing no useful work (but the counter APERF was still running) due to stalling, waiting for memory, waiting for input/output and so on.

So, if at a first frequency f1, the CPU experienced a specific utilization (say, 80% utilization at 800 MHz), it would be useful to know what the corresponding utilization would be to run the same processing workload (e.g. a program application at a different frequency f2, such as 1600 Mhz). In a purely "scalable" workload, the utilization could be expected to be 40% due to the same work being done at double the speed (this workload represents a scalability of 1, or 100% scalability). However, in practice workloads are rarely perfectly scalable. Due to inherent stalls, or other artifacts, doubling the frequency to f2 (in this example), may decrease the utilization by a different amount, since the stalls may not inherently scale—waiting for memory will still be waiting for memory, even if the CPU is running at a higher frequency.

Figure 2B:
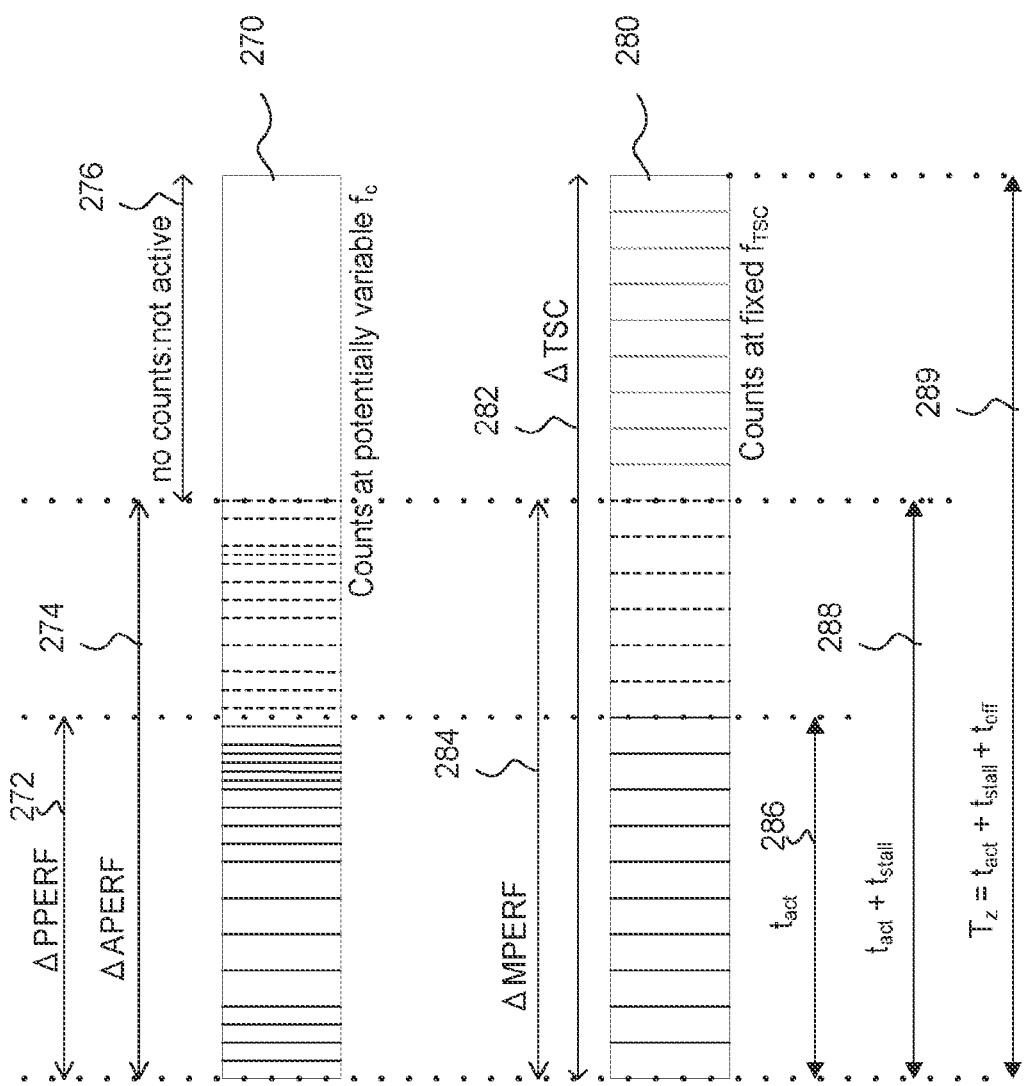
FIG. 2B schematically illustrates example architectural counters used to track Central Processing Unit (CPU) performance.

FIG. 2B schematically illustrates example architectural counters used to track CPU performance. A first block of counts 270 within a sampling period $T_z$ comprises a number of counts ΔPPERF 272 corresponding to useful work performed by the CPU, the count being incremented at three CPU execution frequency. The execution frequency may vary within a sampling time interval depending on frequencies dispensed by at least one of the SOC power governance circuitry 122 or the CPU performance level selection algorithm 244. Also in the first block 270, for which all counts are at the CPU rate of execution, is a number of counts ΔPERF 274 corresponding to a cumulative count of when the CPU is active, including active and yet stalled. A final portion 274 of the first block 270 of duration $T_Z$ comprises a duration 276 when the CPU is inactive and thus the execution frequency based counters do not increment or decrement the count.

In the case of FIG. 2B, contiguous blocks of active but not-stalled counts and active but stalled counts are illustrated in $T_Z$. However, within a given sampling interval, the active but not-stalled counter (PPERF) may be triggered intermittently, with groups of non-contiguous stalled active cycles occurring in the sampling window.

A second block of counts 280 in FIG. 2B schematically illustrates a counter counting at a given constant frequency, $F_{TSC}$, and in which a total number of counts ΔTSC 282 in the sampling period $T_z$ comprises a reference count value ΔMPERF 284 of counts when the CPU is in an active state. It can be seen by comparison of the first block 270 and the second block 280, that a duration $t_{act}$ active counts is identical for both blocks, although the count values differ due to the counts being driven by different clock signals. A duration $t_{act}$ 286 of the count ΔPPERF 272 corresponds to non-stalled CPU active cycles. A duration $t_{act}+t_{stall}$ 288 corresponds to CPU active cycles including when the CPU is stalled. A duration $T_Z=t_{act}+t_{stall}+t_{off}$ 289 corresponds to the sampling window duration including CPU active, CPU stalled and CPU inactive durations.

The GPU utilization may be calculated using different counters than those used for the CPU. A given GPU may have more than EU, so counts may be maintained for each EU of when the EU is active (not idle) and a count to keep track of a number of graphics processing cycles when each EU is stalling. The EU may be considered to be stalling when there is at least one GPU thread is active but not executing.

Table 1 below specifies some example CPU related performance monitoring parameters whilst Table 2 specifies some example GPU related performance monitoring parameters.

TABLE 1

| CPU Terminology | Description |
|---|---|
| APERF | Architectural counter that increments at actual/current frequency |
| MPERF | Architectural counter that increments at base/guaranteed frequency (typically High Frequency Mode (HFM)) |
| TSC | Time stamp counter |
| Frequency | (ΔAPERF/ΔMPERF)*HFM |
| Utilization | (ΔMPERF/ΔMPERF) *ΔTSC |
| Scalability Factor | ΔPPERF/ΔAPERF |
| Pe | Pe is the most efficient work point, below which power is just wasted |
| Palpha | Palpha reflects the maximum power the Operating System is willing to pay to get a certain required performance |

TABLE 2

| GPU Terminology | Description |
|---|---|
| GPU Ticks | Number of cycles the Execution Units in GPU are busy |
| EUNotIdlePerSubslice | EU utilization when the EU is not idle (may include time when EU is stalled) |
| EUStallPerSubslice | Number of slice clocks when EU has threads but is not running any FPU or EM instructions (i.e when the EUs are stalling) |
| NumActiveEUs | Number of EUs that are active |
| Scalability for GPU | ((ΔEuNotIdlePerSubSlice – ΔEuStallPerSubslice)*4 * 8)/(ΔGPUTicks * NumActiveEUs) Note that this metric of graphics scalability is calculated in this example as there is no ready counter in the hardware like the CPU, although counters could be provided |

In Table 2, consider that GPUs may be considered conceptually to be built from "slices," each of which may contains a plurality of (such as three) "subslices." These subslices may each comprise a plurality (e.g., 8, 16 or 32) of "Execution Units" (EUs) to perform the bulk of the processing. Each subslice may also comprise texture samplers to retrieve data from memory and pass it to the EUs, and perhaps one or more other components. The GPUs may also comprise components that may be referred to as an "unslice," which is a GPU component outside of the slices that handles fixed geometry and some media functions.

In some example GPUs the unslice may have a separate power and clock domain that may be independent of the slices. Thus if only the hardware encoding and decoding capabilities of the unslice are currently being used then all of the slices can be powered down or off to reduce energy consumption. Additionally, the unslice may run at a higher or lower rate than the slices, offering the ability to improve performance or power usage depending on the specific processing task being run. Note that the equation for GPU scalability in Table 2 is one example only and the factors 4*8 in the numerator are GPU architecture-specific and non-limiting.

Calculation of Scalability of Workload

Scalability of workload with frequency may be calculated differently for each processing unit. For example, for the CPU, a scalability equation may be derived for the CPU by making a number of approximations. Here, for a transition from a current frequency $f_c$ to a new target frequency $f_n$, the new utilization $u_n$ associated with the target frequency may be evaluated as a function of following factors:

Frequency change from existing fc to a new target frequency fn

Present Utilization $u_c$

Present Scalability factor, $S_c$ as ratio of $\Delta PPERF/\Delta PERF$

In particular, the following equation is one example of how a predicted new utilization for a new target frequency $f_n$ can be calculated from a current frequency and a current scalability $S_c$ determined from the CPU architectural counters as indicated in Table 1 above.

$$u_n = u_c\left(s_c, \frac{f_c}{f_n} + (1-s_c)\right) \quad \text{eqn. 3}$$

This allows the impact of a change in target frequency on the utilization to be assessed in advance of the allocation of the frequency to the CPU.

The derivation of eqn. 3 involves a number of simplifying assumptions. Different embodiments may employ different equations for scalability depending on approximations made to derive the functional relationship between frequency, scalability and utilization. The following equations define the scalability s, and the utilization $U_Z$ in a time window Z. In this example, $t_{act}$ is a time duration within $T_z$, corresponding to the CPU being in the active state; $t_{stall}$ is a time duration within $T_Z$ when the CPU is active but has stalled; and $t_{off}$ is a duration within $T_Z$ when the CPU is not active (e.g. off or in a sleep state). In any time window T, $$t_{act} \propto \frac{1}{f}.$$

The scalability and the utilization can be defined in terms of the time durations as follows:

CPU Scalability, $$s_z = \frac{\Delta PPERF}{\Delta APERF} = \frac{t_{act}}{(t_{act} + t_{stall})} \quad \text{eqn. 4}$$

CPU Utilization, $$U_z = \frac{(t_{act} + t_{stall})}{(t_{act} + t_{stall} + t_{off})} \quad \text{eqn. 5}$$

FIG. 2B schematically illustrates how the execution counter ($\Delta PERF$) and the useful work counter (PPERF) for the CPU can be visualized in time and in frequency.

A further simplifying assumption made in the derivation of eqn. 3 above is that the stall time, $t_{stall}$, is not an explicit function of the local DFVS (execution clock and thus is invariant with changes to execution frequency. Equivalently $\{\Delta PPERF$ at $f_c = \Delta PPERF$ at $f_n\}$ for all current and target frequencies $f_c$ and $f_c$ respectively. Thus the extent of work associated with a processing task as counted by the useful work (stall free) counter $\Delta PPERF$ remains the same for different execution frequencies although its corresponding active time duration, $t_{act}$, does vary with frequency.

Calculation of Scaled Power at Different Target Frequencies

Based on a pre-silicon (i.e. pre-fabrication) or other power model for each PU (CPU, GPU, etc.), an appropriate equation may be derived for scaled power. The power model may typically be based on a power virus for that processing unit, but could be as accurate as allowed by the model. The specific equations for calculating scaled power at different frequencies may also be specific to each processing unit. In general, a cumulative "scaled CPU power" can be expressed as a function of individual logical CPU (hyperthread) power. Such a mathematical relation can be derived using appropriate curve fitting tools (algorithms) as applicable to a power profile of a given processing platform. Similar scaled power equations may be derived for other processing units (PUs) such as the GPU and IPU. Scaled power may characterize how power expenditure of a PU varies due to change in frequency from given initial value to any final value of frequency.

Similarly one can derive equations for:

Frequency as a function of utilization and power

Utilization as a function of power and frequency

An equation for power as a function of frequency and utilization may be part of a pre-silicon model. This pre-silicon model may be, for example a spreadsheet giving values of power for different frequencies and utilizations in addition to other parameters such as temperature, process technology implemented and such like.

With the above assumptions and inputs from scaled power and system utilization equations, one example of a PU-specific performance level selection algorithm that could be implemented as the CPU performance level selection algorithm 244 of FIG. 2A for example, is as follows:

1. Check PU utilization (architectural counters); apply averaging (tau/alpha for short & long sampling windows Tz). The averaging allows coarse and fine granularity of workloads to be observed to distinguish between more and less "bursty" workloads for example. This can be done by (a) observing and averaging the utilization over a relatively long window, say 32 milliseconds. This is denoted as alpha. Then (b) the same workload may be observed over a relatively short window, say 4 ms the tau). The alpha window may provide a trend in utilization whereas the tau window allows spikes in utilization to be observed.

2. Compute system utilization (across all PU cores), which may be achieved via a priori mathematical derivation based on individual CPU utilization, just as with scaled power.

The utilization for each thread may be measured using the architectural performance counters such as $\Delta PERF$ and MPERF. The utilization may be calculated using a sum of utilizations of a plurality of cores, such as by calculating a weighted average across a plurality of cores.

3. Check current scalability Sc

4. Check polarity of any change in utilization (util+/util−) over recent time for the given PU 5. Using the above described scaled power and system utilization, estimate the scaled utilization and resultant power 6. Reward scalability
   a. If current scalability Sc is above a certain (programmable) threshold, then a higher frequency choice is more likely to be selected from range of target frequencies available
   b. If current scalability Sc is below the threshold, the algorithm may be more conservative in allowing higher frequency selections because the extra power expenditure associated with the higher frequency is less likely to result in and increase in useful work due to the higher proportion of stalls characterizing the workload.
7. For a given scaled power and system utilization, select an optimal (or at least best known) frequency
8. Check if the scaled power is within bounds dictated by the EPP because the EPP may guide an instantaneous power boundary
9. Resolve frequency allocation for the particular processing unit (CPU, GPU, IPU or other PU) and set clock to the resolved frequency as part of DVFS.

With regard to item 8 above, the EPP may guide an instantaneous power boundary by providing a scale which at one end represents a highest frequency choice and at the other end represents a lowest frequency choice. Say, for example EPP=0 is set by the user to indicate they would like highest performance, then the choice of frequency maybe to select the highest. If EPP=100 (lowest power), then the lowest frequency may be selected.

If the EPP is somewhere in between 0 and 100, and there are, for example, ten different frequencies that could be selected to satisfy the prevailing utilization, then the EPP may be used to guide which frequency of the range is selected. For example, if EPP=50, then a mid-point of the available frequencies may be selected.

Figure 3:
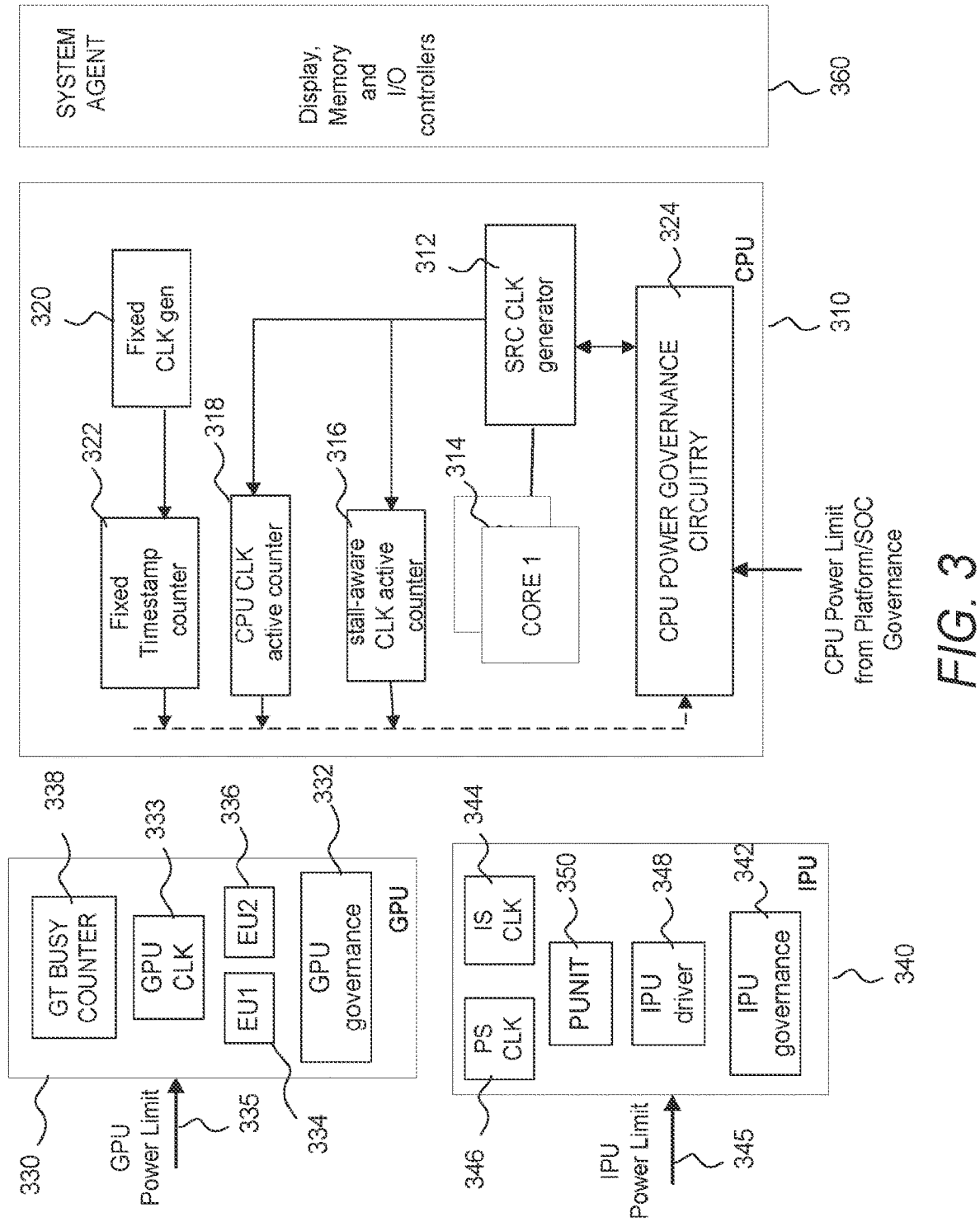
FIG. 3 schematically illustrates processing units of a SOC and their respective architectural counters.

FIG. 3 schematically illustrates processing units of the SOC and their respective architectural counters. The system comprises a CPU 310, a GPU 330, an IPU 340 and a system agent 360. The CPU 310 has local CPU power governance circuitry 324 to monitor counters in the CPU and to implement CPU execution frequency allocations in coordination with the SOC power governance circuitry 122 of FIG. 1. The local CPU power governance circuitry 324 may be implemented entirely in hardware entirely in software or be a combination of hardware and software. The CPU 310 has a source clock generator 312 controlling execution of program instructions by one or more physical cores 314. The source clock generator 312 operates at a clock frequency that may vary according to a desired processing performance level. The CPU comprises a stall-aware clock-active counter 316 to count clock cycles of the source clock 312 excluding when stalls are occurring (performing the ΔPPERF count for example) and further comprises an active counter 318 which counts at a rate determined by the source clock but counts all active cycles regardless of whether or not processing has stalled (performing the ΔMPERF count for example). The CPU 310 also has a fixed clock generator 320 having a fixed dock frequency, $f_{TSC}$, which controls a count rate of a fixed timestamp counter 322 (performing the ΔMPERF count for example). The CPU power governance circuitry 324 receives one or more power limits from the SOC power governance circuitry 122 to constrain a choice of execution frequency to be selected from a range of target frequencies.

The GPU 330 comprises: GPU governance circuitry 332 to set an appropriate GPU performance level; a GPU clock generator 333; a first execution unit 334; a second execution unit 336; and a GT busy counter 338. In this example, the GPU has its own GPU clock generator 333, although in other examples having different GPU architecture, it may not. The GPU 330 may have more than two EUs and, similar to a multi-core CPU, at any one time, all of the EUs or only a subset of the EUs may be active when graphics processing is being performed. The GT busy counter 338 may count a number of dock cycles, $\Delta gt_{busy}$, of the GPU clock generator 333 in a sampling interval when at least one of the EUs is active. The GPU 330 of this example has only a single counter 334 and as indicated in Table 2, the scalability for the GPU is calculated using a count ΔGpuTicks taken from the GT busy counter 338 and by software tracking a number of active EUs and when each EU is active and when each EU has stalled (e.g. not running any floating point unit instructions). The GPU 330 may receive one or more GPU power limits 335 from the SOC power governance circuitry 122.

The GPU governance circuitry 332 may be an on-demand type governor that runs as one or more power control algorithms in a graphics microcontroller (not shown). The governance circuitry 332 may use Active→Idle and Idle→Active interrupts to identify GPU active time when there is no Frames per Second (FPS) target specified. For example, for playing video a minimum of 30 FPS may be desirable for a good picture quality and some workloads such as games may ordinarily run at a relatively high FPS of, for example 90 FPS. An FPS target may be used as a performance adjustment parameter. A ratio of GPU active time to total time in a given sampling interval may give the GPU utilization which in turn may be used to drive GPU frequency selection.

The utilization and scalability equations may differ for different processing units. Example equations for GPU utilization and GPU scalability may be as specified in the following.

$$GPU \text{ Utilization} = \frac{(\Delta gt_{busy})}{(\Delta TSC_{CPU})} \quad \text{eqn. 1.2}$$

$$GPU \text{ Scalability}_{EUFLEX} = \frac{\Delta(AggregateCounter)}{\Delta(GpuTicks) \times NumActiveEUs} \quad \text{eqn 2.2}$$

Where Δ (AggregateCounter) is a cumulative count of active cycles in a given sampling interval for all EUs 336, 338; NumActiveEUs is the number of active EUs in the given sampling interval; and Δ(GpuTicks) may be equal to $\Delta gt_{busy}$.

The IPU 340 has IPU power governance circuitry 342 which may be implemented entirely in hardware, entirely in software or via a combination thereof. The IPU 340 has an input subsystem clock 344 (IS_clk) and a processing subsystem clock 346 (PS_clk), which make it possible to separately control input subsystem and processing subsystem frequencies. The IPU 340 may have similar architectural counters (not shown) to the CPU to count active IPU cycles and non-stall active CPU cycles at the relevant IPU frequency. The IPU 340 may also have a fixed timestamp counter (not shown) to count active IPU cycles. Separate sets of active and non-stall active architectural counters may be provided to count at the input subsystem clock frequency and the processing subsystem clock frequency. The IPU may receive one or more IPU power limit 345 from the SOC power governance circuitry 122 that may constrain frequency choices implemented in the IPU 340. In alternative embodiments, the IPU 340 may use one or more IPU driver to monitor utilization and to make power-aware frequency choices based on an IPU power profile model.

At a high level, the IPU 340 may have an Input Subsystem (IS) and a Processing Subsystem (PS) and each can be controlled separately with respect to their respective operational frequency. An IPU driver 348 may internal heuristics that are utilization and usage based to request respective frequencies. For example, during image capture, only the IS component may be controlled to respond at the desired frequency. Subsequently, after image capture (or if necessary in a staggered manner), the Processing Subsystem may be controlled to run at the desired frequency in order to meet a use case (a particular data capture rate for example). In one example arrangement, the IPU 340 may have the following DVFS support:

- IS_dk 344 is derived from SA_PLL a System Agent phase locked loop that can operate either in 1600 MHz or in 2000 MHz (may be fixed per platform). The driver may request IS_dk 344 frequencies in the range 100-400 MHz. A set of "PUNIT" firmware 350 may selects the actual divisor settings based on the SA_PLL phase locked loop frequency. Note that the system agent 360 (see FIG. 3) is a component that couples the CPU, IPU and GPU to display, memory and I/O controllers.
- PS_dk 346 may operate from 200 to 800 MHz in 25 MHz steps, with additional frequencies below 200 MHz for debug purposes. The lowest possible frequency may be, for example, 50 MHz. Frequencies below 200 MHz may not be valid for functional use.

The frequency ranges stated above are non-limiting example ranges. The IPU driver 348 requests respective IS and PS frequencies to the PUNIT firmware 350, and final grant of the requested frequency may be under control of the PUNIT firmware 350. If the one or more IPU power limits 345 (e.g. a system limit such as a thermal limit) does not allow an increase in the clock frequency, then the PUNIT hardware 350 may ignore a request from the IPU driver 348 to change the clock frequency.

The IPU 340 is an example of a complex processing unit that has internal coordination implemented between the IS and the PS subsystems and thus implementation of a power-aware frequency allocation to each subsystem according to the present technique can result in improved power efficiency by intelligent allocation of power between the two sub-systems and improved performance overall for a given IPU power budget.

Figure 4:
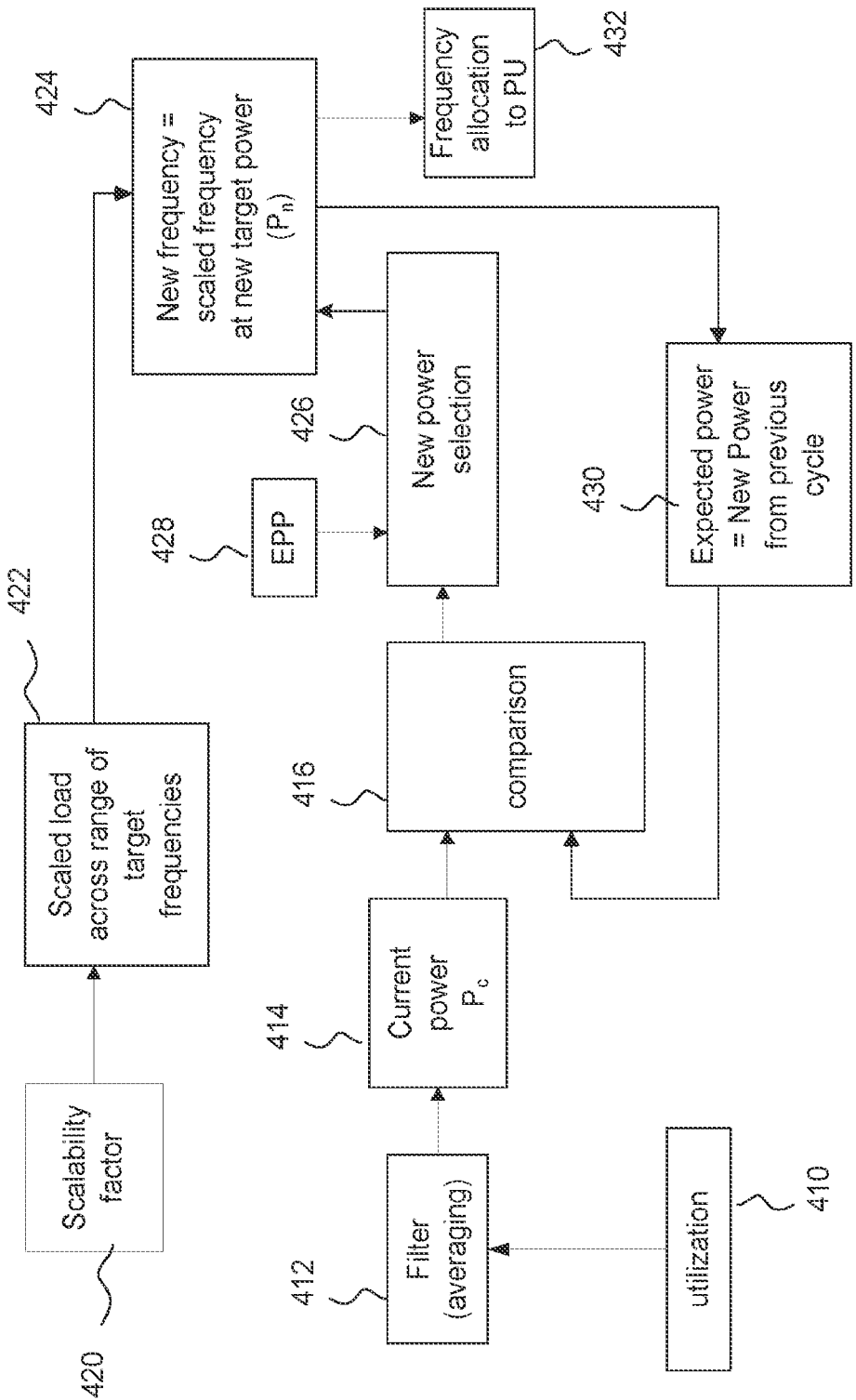
FIG. 4 schematically illustrates a functional flow for a power-aware frequency selection algorithm for a processing unit.

FIG. 4 schematically illustrates a functional flow for a power-aware frequency selection algorithm for a processing unit. At block 410 a current utilization of the processing unit is determined from the architectural counters or otherwise. At block 412 filtering of the current utilization values may be performed by averaging over different sampling periods to improve accuracy. Since the utilization may change within the sampled time window, reducing the sampling window may improve accuracy. An overhead of shorter-duration sampling intervals may be reduced by using a microcontroller-based or firmware-based implementation. Sampling intervals may differ for different processing units. For example, the CPU sampling interval may be shorter than the GPU or IPU sampling intervals. At block 414 a current power usage of the processing unit is to determine, for example, using a local power sensor and the current power, $P_c$ is supplied to a comparison block 416. At block 420 a current scalability $S_c$ is determined, for example from eqn. 1.1 for a CPU or from eqn. 2 for a GPU.

At box 422, values of scaled utilization are calculated for a range of target frequencies that could potentially be selected as a new frequency, although in some examples a single target frequency may be evaluated. The scaled utilization for a given target frequency $f_{ti}$ may be calculated by using: (i) the value of $S_c$ determined at block 420; (ii) the current frequency; (iii) the given target frequency $f_{ti}$; and (iv) the current utilization $U_c$ into eqn. 3. At box 422 for each target frequency a corresponding set of values {utilization, $U_{ti}$; power $P_{ti}$ and scalability $S_{ti}$} may be determined using the predicted power profiles 248, 258, 268 (see FIG. 2). Once the sets of parameters for plurality of target frequencies have been determined at box 422, at box 424 a new frequency may selected based on the PU-specific relationship between frequency, power and utilization. The frequency selection may be made such that a new target quantified power is known prior to implementation of the new frequency by the processing unit. The selected new frequency is implemented at box 432 where the performance level of the PU is adjusted to align with the new frequency value.

Selection of a new power at box 426 may be made depending on observed trends in recently measured values of utilization and scalability or based on differences between expected power and/or utilization calculated in a previous frequency updating round and respective actual (measured) values once the selected frequency has been implemented. If changes in utilization are below a threshold then the PU may continue to run at the current power Pc. However, if utilization increases or decreases by more than a threshold magnitude then a new power may be allocated at box 426. Assignment of a new power $P_n$ at box 426 may also or alternatively depend on system parameters such as an EPP 428 and a minimum power, a maximum power or another power limit. For example, the PU may assign relative priorities to performance and power power-saving depending on the EPP 426. The new power allocated at box 426 may also be dependent on the per-unit power limit for that PU allocated by the platform power governance circuitry 110. Thus, even without any appreciable change in utilization or power expenditure, a new power may be assigned to the processing at box 426 in response to an increase in the per-unit power limit. One example of a formula that may be used in the new power calculation of box 426 is $P_n=(P_c\pm Err)*K*f(EPP)$, where K is a constant and Err is a difference between a current power and an expected power calculated in a previous frequency updating cycle from a target power and a scalability function and f(EPP) means a function of the EPP. The EPP may be a system parameter or may alternatively be processing unit specific.

Selection of the new power at box 426 feeds into the new frequency choice at box 424. The new frequency selected at box 424 may have an associated predicted (i.e. expected) new power and predicted new utilization and predicted new scalability. At box 430 an expected power calculated in a previous frequency updating cycle (in which a current operating frequency was determined before it was implemented) is set equal to the predicted new power determined at box 424. The expected power is a second input to the comparison box 416. A comparison at box 416 of the expected power that was set at box 430 (corresponding to a previous cycle and the currently implemented frequency) and the current power output from box 414 allows any discrepancy (denoted "Err" in the above equation) between the assigned new power and the current power to be corrected at box 426. Thus, there is a feedback loop to correct for errors in power predictions made using the power profiles.

Figure 5:
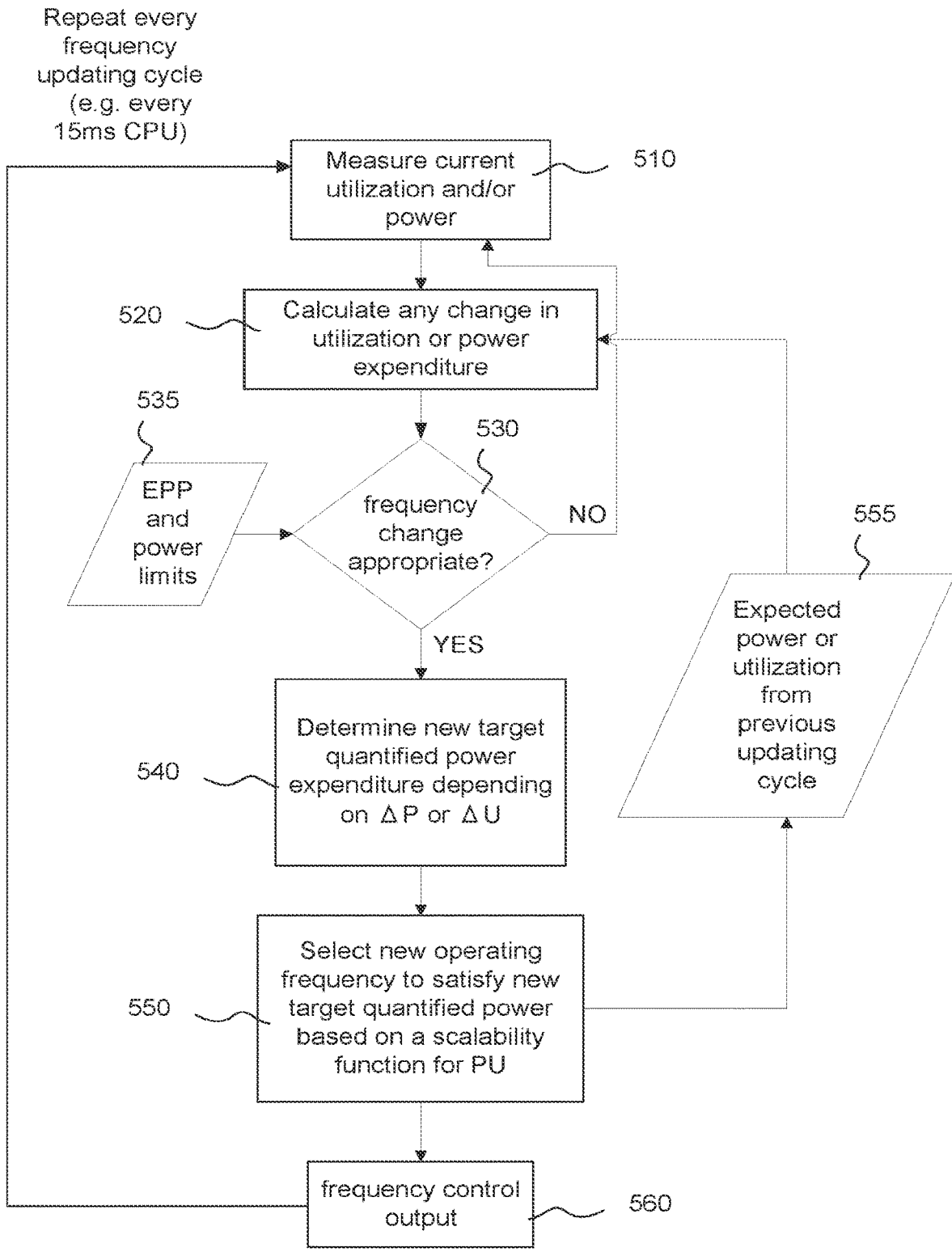
FIG. 5 is a flow chart schematically illustrating a power-aware governance algorithm for a processing unit.

FIG. 5 is a flow chart schematically illustrating a power-aware governance algorithm for a processing unit. The process of selecting a processing unit performance level begins at element 510, where a current processing unit utilization, $U_c$, is determined, for example, using eqn. 1.1 above for a CPU or using eqn. 1.2 above for a GPU. Alternatively, or in addition, a current power expenditure of the processing unit may be measured at box 510. The power expenditure could be determined based on values obtained from one or more power sensors or could alternatively be derived from a utilization measurement based on a corresponding power profile.

Next, at element 520, any change in utilization, $\Delta U$, or change power expenditure, $\Delta P$, relative to a previous cycle may be determined. For example, the measured value of utilization or power for a current operating frequency at a current time may be compared with an expected utilization or power predicted from a power profile in a previous frequency-updating cycle as shown in boxes 414, 416 and 430 in FIG. 4. Alternatively, $\Delta U$ and $\Delta P$ may be determined based on observed past trends in measured values of utilization and power from a current execution of a given processing workload or from stored dated corresponding to the same or similar workloads being executed on the same or similar processing units.

At flow chart element 530 a decision is made as to whether or not a frequency change from a current operating frequency is appropriate. This decision may depend on at least one of the $\Delta U$ and $\Delta P$ determined at element 520, but may also or alternatively depend on other data input as shown at element 535, where power limits such as a minimum power expenditure for the processing unit, a maximum power expenditure for the processing unit, and one or more further power limits such as a boosted power limit sustainable for only up to a maximum time may be considered when making the decision. Also, an EPP specific to the processing unit or applicable to the entire processing platform may be taken into account at element 530. In one example, a frequency change may be deemed appropriate at element 530 if $\Delta U$ or $\Delta P$ are greater than or equal to a respective minimum threshold magnitude. In this example if $\Delta U$ is greater than the corresponding threshold magnitude then a frequency change corresponding to a change in power expenditure is deemed appropriate whereas if $\Delta U$ is less than the threshold magnitude no change is to the current operating frequency is deemed appropriate in this frequency updating cycle. At element 530, if no change to the operating frequency is deemed appropriate then the process returns to element 510 and waits until instigation of the next frequency updating cycle. The frequency updating cycle may be performed periodically. The periods for frequency updating may be different for different ones of the processing units. For example, the frequency updating cycle period may be 15 ms for the CPU, 100 ms for the GPU and 100 ms for the IPU.

If at decision element 530 it is determined that a frequency change is in fact appropriate, then the process proceeds to element 540 where a new target quantified power expenditure is determined based at least in part on $\Delta P$ or $\Delta U$ or both. The target new power may be quantified in dimensioned units for power such as Watts or in some other way that allows the processing platform to know the power expenditure by each processing unit prior to implementing the frequency change by altering the clock rate. This conveniently enables more processing platform control over performance per unit of power expended. The new target quantified power may be identified as corresponding to an isometric power line on a power profile as will be described below in FIG. 6A.

Once a target power is identified at process element 540, the process proceeds to element 550 where a new operating frequency (or operating voltage because the two parameters are related) is selected with a view to achieving as close as possible a match to the new target quantified power expenditure. One way of achieving this is to make use of one or more observables such as a currently observed utilization and a current scalability determined using architectural counters and to use a scalability function such as the one specified by equation 3 above to determine which new frequency is most likely to result in achieving the desired new target quantified power expenditure given knowledge of the current utilization. The current scalability, $S_c$, may be determined for the processing unit, such as by using eqn. 2.1 for a CPU or by using eqn. 2.2 for a GPU. In some examples, a scalability value determined from architectural counters may correspond to a frequency updating cycle other than the current cycle. For example, a previously measured scalability value may be used in combination with a known isometric trend to estimate an appropriate current scalability value to use at element 550 when selecting a new frequency.

In a parameter space representing an operating point of a processing unit, the parameters of frequency utilization and power are all relevant. The new frequency is what is to be selected and the new power expenditure is a target value driving the particular new frequency selection for power-aware governance distributed amongst multiple PUs. The utilization and frequency are inherently linked, but the scalability is a further factor that may be taken into account to improve control over the power expenditure resulting from the frequency change that is implemented. The use of a power profile, a target power expenditure and a scalability measurement and scalability function allow the power expenditure of the processing unit to be more predictable in the frequency updating process according to the present technique.

Once the new operating frequency has been selected at element 550, the process proceeds to element 560 where control is exercised to implement the selected new frequency in a subsequent processing cycle and then the cycle returns to the beginning of the flow at element 510. Note that at element 550 when a new frequency is selected, at least one of the new target quantified power and corresponding expected utilization may be fed back to element 520 for use in determining $\Delta P$ or $\Delta U$ is a subsequent frequency updating cycle.

The duration of a frequency updating cycle may differ from the duration of a processing cycle and the processing cycle duration is itself potentially variable as a result of the DVFS. The frequency updating may be performed intermittently rather than periodically in some examples and the frequency updating periods specified above are non-limiting examples.

Figure 6A:
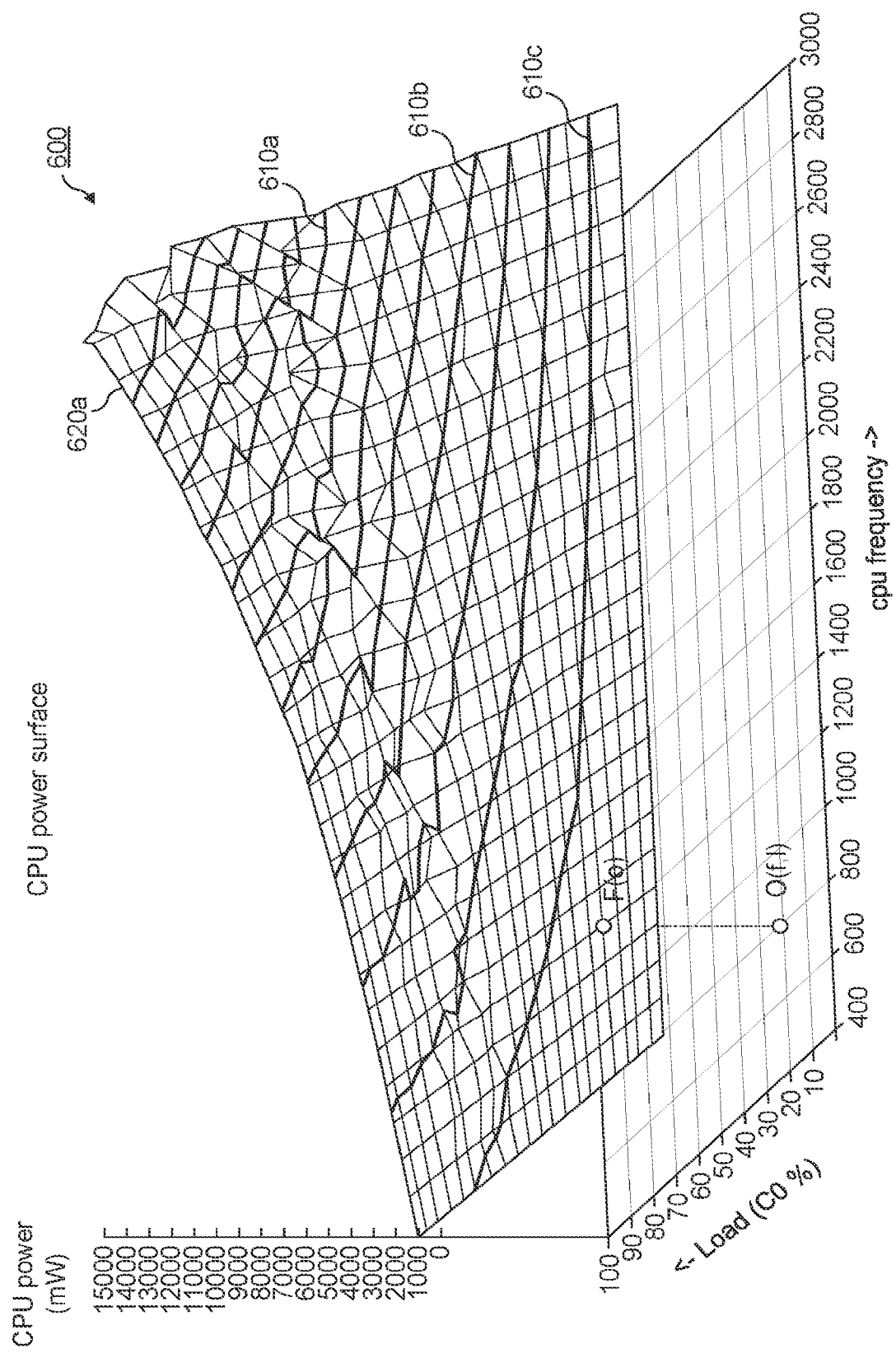
FIG. 6A is a three-dimensional plot schematically illustrating an example of a power profile for a CPU depicting a relationship between frequency, utilization and power consumption for a specific example workload.

FIG. 6A schematically illustrates an example of a 3D power profile for a CPU generated using a synthetic workload. The power profile 600 is a 2-dimensional (2D) surface in a 3-dimensional (3D) parameter space with CPU frequency in Mega Hertz (MHz) along an x-axis, utilization (or equivalently load) in % of active cycles along a y-axis and CPU power in milli-Watts (mW) along a z-axis. Grid lines parallel to the x-axis are isometric utilization lines along which the utilization has the same value, grid lines parallel to the y-axis are isometric frequency lines along which frequency has the same value, and the curved lines 610a, 610b, 610c plotted in the 2D surface, which is effectively a power surface, are isometric power lines along which power expenditure has the same value. Each isometric power line is parallel to the x-y plane due to having the same power consumption value (z-axis) for each point on the line. Thus, the isometric power lines are analogous to contour lines on a map. Note that due to the 3D nature of the plot 600, the power consumption along an isometric power line such as the line 610a may appear to be visually different. The same applies to the isometric frequency and isometric utilization lines on the 2D power surface of the 3D plot.

In some examples, the power profile 600 (or at least a part thereof) can be generated based monitoring the operation of the processing unit. In some other examples, the power profile may be generated at least in part by monitoring operations of one or more other processing unit (e.g., which can be external to the processing platform 100), where the one or more other processing units have similar characteristics and are of similar type as the processing unit concerned 125, 127, 129. In some other embodiments, the power profile may be generated by computer simulation of a model of the processing unit. In yet other examples, the power profile may be generated using a combination of these above discussed methods Any one point on the power surface may correspond to an operating point of the CPU characterized by a frequency value, a utilization value and a power value O (f, U, P). Thus, for example, the power profile may be used to predict or estimate how for a given processing workload the CPU utilization might vary as the operating frequency is increased. The power penalty for increasing the operating frequency may also be determined from the power profile. It can be seen by the way the 2D power surface rises towards the back, right hand corner of the 3D plot that power expenditure tends to increase both as the utilization increases and as the frequency increases. When the frequency is relatively low or the load is relatively low or when both the frequency and the load are relatively low, the power consumption is also relatively low.

When dynamically varying a processor frequency, certain assumptions can be made about the processing workload (e.g. a particular program application being executed) to allow the power profile 600 to be used to predict an expected utilization and an expected power consumption when an operating frequency is changed from a current frequency, fc, to a new frequency, fn, perhaps depending on at least one of an observed utilization at fc and an observed power consumption at fc. Different power surfaces may be available corresponding to different processing workloads, for example, different program applications such as a gaming application, a video conversion application and a DNA sequencing application.

In conventional systems that implement DVFS, frequency maybe used as a main parameter to determine an operating point of a CPU (processing core). For example, there may be a maximum predetermined operating frequency that cannot be exceeded, so DVFS circuitry may set operating frequencies such that the frequencies selected are constrained by the maximum frequency. There may also be a minimum operating frequency. However, as can be seen by the power surface of FIG. 6A, the power consumption may vary considerably along an isometric frequency line such as the line 620a at around 2800 Mhz. In particular, along the isometric frequency line 620a, as the utilization (load) increases the power consumption also increases in this non-limiting example from around 1000 mW at the lowest utilization to around 14000 mW at 100% load. Even if a maximum power threshold was to be set, simply selecting an operating point O(fn, Un, Pn) according to a frequency range and a utilization without an awareness of a power consumption change associated with the performance level change could be potentially problematic. Indeed, whilst the operating frequency may be changed as in conventional DVFS systems, even if a prediction can be made from the 3D power profile of which operating points lie on a particular isometric power line, the utilization cannot be readily controlled because any change in utilization is a response of the processing unit to a change in frequency depending on the workload that is executing. Thus, it may be difficult to predict what effect a change in frequency will have on a utilization and power expenditure although the power profile can provide some guidance.

However, according to the present technique, energy efficiency may be improved and more flexibility in setting appropriate frequency values can be achieved by building a power expenditure awareness into the frequency selection process. This power expenditure awareness may take into account both a target power and a scalability and some examples may use isometric power lines of the power profile to assist in setting a new target power expenditure and also use a scalability value such as one read form architectural registers of the processing unit to help with guidance in achieving a power expenditure at or close to a new target power expenditure. This can provide the processing unit with a reliable awareness of power expenditure of a new operating point even before a new frequency has been implemented. This is likely to result in fewer assertions of throttling signals and reduced likelihood of inadvertent system failure due to breach of a thermal limit, a peak current violation, a voltage droop or the like.

Furthermore, instead of an operating system of the CPU centrally governing power control on the processing platform, power-aware governance can be replicated in every processing unit of the platform having the capability to change an operating frequency. This allows power expenditure to be a common currency for governance in all processing units. The use of a power aware governance algorithm replicated in two or more processing units of a processing platform also allows for an ability to have distributed control efficiency, which may be defined as performance per Watt. This becomes possible because the power-aware governance means that power (e.g. Wattage) is well quantified and known at every decision point.

Figure 6B:
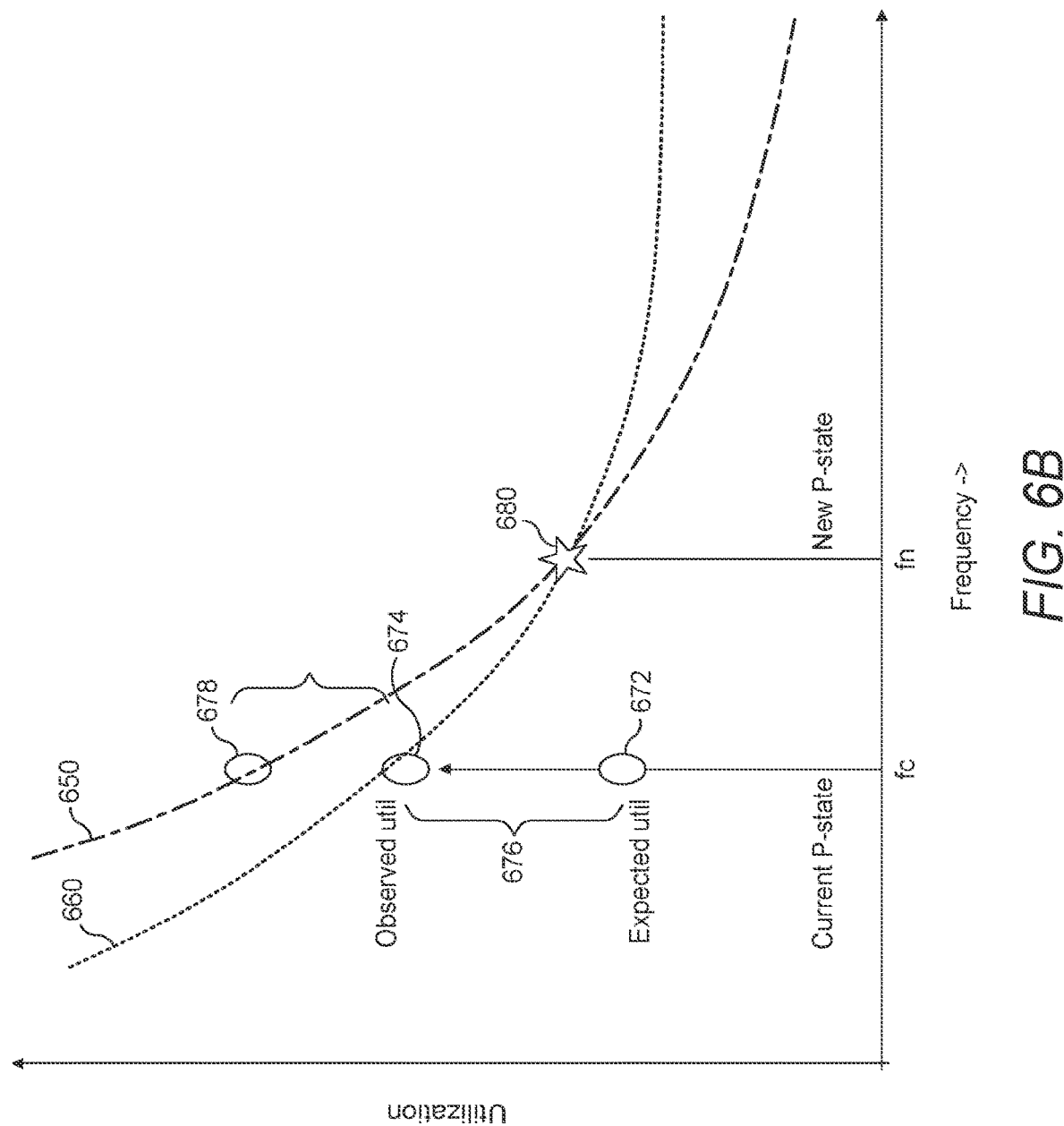
FIG. 6B is a two-dimensional graph of frequency against utilization for a processing unit depicting an isometric power line and a scalability line for a processing unit.

FIG. 6B schematically illustrates a graph of frequency against utilization for a processing unit. The graph shows an isometric power line 650, which may be considered as a projection onto the load-utilization plane of an isometric power line such as 610a, 610b, 610c in the 3-dimensional plot of FIG. 6A. Also plotted in the FIG. 6B graph is a scalability line 660 which represents a variation of utilization with frequency for a particular processing unit. The scalability line in this example has been generated from the scalability equation, eqn.3, which allows a new load to be calculated based on a current frequency, a new (target) frequency and a current scalability. The current frequency is known, the new frequency may be selected for evaluation and the current scalability maybe measured via the architectural counters (e.g. APERF and PPERF for a CPU).

In the FIG. 6B example, a first data point 672 and a second data point 674 each correspond to a current frequency. The first data point 672 corresponds to an expected utilization at the current frequency, which was predicted to be the utilization for the current frequency in a previous frequency setting cycle before the current frequency was implemented by the processing unit. The data point 672 is analogous to the expected power at element 430 in the process flow diagram of FIG. 4. The second data point 674 corresponds to a utilization actually observed at the current frequency, for example by using the architectural counters APERF and MPERF and eqn. 1.1.

A discrepancy ΔU 676 between the observed utilization value of the second data point 674 (y coordinate) and the expected utilization value of the first data point 672 (y coordinate) may arise due, for example, to a change in the workload characteristics since the last frequency updating cycle such as a change in the scalability or the nature or the processing tasks. However, there are potentially multiple factors influencing a frequency choice for a frequency update, so a change to at least one of the system parameters, such as the EPP or a system-level power limit or processing unit parameters such as the unit-specific power limit received from the platform power governance circuitry 110 (see FIG. 1) may trigger a change in an operational frequency setting of a processing unit. Instead of determining the difference in utilization ΔU 676 between the measured (observed) operating point 674 and the expected operating point 672, in an alternative example a difference in power could be determined between these two points. A difference in power would imply a difference in utilization at the given frequency for which the prediction was made.

The scalability line (or curve) 660 may be generated from eqn. 3 using the measured values of scalability and utilization corresponding to the second data point 674 and hence the second data point 674 is a point lying on the scalability line 660. In other examples, the scalability line may not go through the second data point 674 corresponding to the data measured in the current cycle, but may be determined based on scalability trends or a measured data value from a different cycle. The scalability line 660 may correspond to a different trajectory on the 2D power surface of FIG. 6A relative to the isometric power line 650. The scalability line 660 is likely to cut across several isometric power lines in the 3D plot of FIG. 6A. The scalability line 660 may characterize how utilization of a PU may vary due to a change in frequency from given initial value to any final value of frequency and thus may provide a causal relationship between frequency change and utilization change. By way of contrast, isometric power lines simply represent points in the 3D parameter space but with no such causal relationship. In the map analogy, the scalability line 660 may be considered to be a footpath on the surface of a slope that intersects (at one point) a contour line corresponding to a power expenditure target. FIG. 6B may be considered a 2D projection of the 3D plot of FIG. 6A, but note that the scalability line 650 has different power values along its length. The scalability function provides the information needed to predict how the utilization may vary with frequency to enable a new target power, or at least a value close to the target, to be achieved when the new frequency is implemented by the processing unit.

The processing unit power governance circuitry (e.g. 324, 332, 342) in the current frequency setting cycle is to set a power expenditure target, taking into account at least the change in utilization corresponding to the discrepancy ΔU 676 and perhaps also other factors like any change in an energy performance preference either for the individual processing unit or for the platform as a whole. Any changes in the processing unit power limit, which may also dynamically vary, may also be taken into account in deciding upon a new target quantified power expenditure. In this example, the isometric power line 650 corresponds to the new target quantified power expenditure and this may have an associated power value in mW. Note that at the current frequency, the second data point 674 does not lie on the isometric power line 650.

In this example, the new target quantified power expenditure is higher than a power expenditure corresponding to the second data point 774 (not shown). This is consistent with the observed utilization being higher than predicted by the previous cycle. The isometric power line 650 defines a range of frequencies and associated utilizations, but the scalability line 660 may be used to determine what value the new operating frequency may be set to allow the processing unit to hit or most likely achieve a power close to the new target quantified power expenditure. Otherwise the variation in utilization with frequency may be difficult to predict to the target power would be difficult to achieve without multiple trial and error implementations of setting new operating frequencies and monitoring resultant power expenditure and utilization changes. In this example, an intersection of the scalability line 660 with the isometric power line 650 gives an appropriate operating point 680 from which the new frequency can be taken. Thus, in the frequency updating process, a new frequency is allocated by determining any power changes indicated appropriate by at least the change in utilization ΔU 676, setting a new target quantified power expenditure and selecting a frequency to satisfy the new target quantified power expenditure using an isometric power line of the power model and a scalability function.

The scalability line 660 is not an isometric power line so power expenditure may vary for different points along the trajectory of the line 660. However, it can be seen from a third data point 678, which lies on the isometric power line 650 at the current frequency, that the new target quantified power expenditure would correspond to a higher utilization at the current frequency and thus the new target quantified power expenditure represents an increase in power expenditure relative to the current power expenditure. The increase in power consumption associated with implementing a new frequency on the isometric power lie 650 may depend on one or more of ΔU, ΔP and EPP. In other examples, the power expenditure for the frequency update may decrease, for example, responsive to the observed utilization being more than a threshold magnitude less than the expected utilization.

FIG. 7 is a table listing a sequence of processing elements to implement power governance for processing units according to the present technique. This table illustrates how similar logical elements of the sequence may be applied to the CPU, GPU and IPU and may be similarly extended to other processing units. The scalability equation according to examples of the present technique may be a generic scalability equation applicable different types of processing unit, such as CPUs, GPUs and IPUs or at least to a plurality of processing units of the same type.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. The circuitry may alternatively be firmware. Program instructions may be used to configure logic gates of general purpose or special-purpose processor circuitry to perform a processing function. Different elements of circuitry may be functionally combined into a single element of circuitry in some examples.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations. The machine-readable instructions may be executed by a processor or an embedded controller.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

EXAMPLES

The following examples pertain to further embodiments.

1. Power governance circuitry to control a performance level of a processing unit of a processing platform, the power governance circuitry comprising:
measurement circuitry to measure a current utilization of the processing unit at a current operating frequency and to determine any change in utilization or power;
frequency control circuitry to update the current operating frequency to a new operating frequency by determining a new target quantified power expenditure to be applied in a subsequent processing cycle depending on the determination of any change in utilization or power and to select a new operating frequency to satisfy the new target quantified power based on a scalability function specifying a variation of a given value of utilization or power with the operating frequency.

2. Power governance circuitry may be the subject-matter of example 1 or any other example described herein, wherein the given value of utilization is the current measured utilization at the current operating frequency and the given value of power is the current measured power at the current operating frequency.

3. Power governance circuitry may be the subject-matter of example 1 or any other example described herein, wherein the frequency control circuitry is to determine the new target quantified power expenditure based at least in part on feedback corresponding to a discrepancy between an actual power expenditure and a value of the target quantified power expenditure predicted from a previous frequency updating cycle.

4. Power governance circuitry may be the subject-matter of any one of examples 1 to 3 or any other example described herein, wherein the frequency control circuitry is to determine the new target quantified power expenditure based at least in part on feedback corresponding to a discrepancy between an actual utilization and a value of an expected utilization calculated by applying the scalability function and corresponding to a previous frequency updating cycle.

5. Power governance circuitry may be the subject-matter of any one of examples 1 to 3 or any other example described herein, wherein the measurement circuitry is to perform the determination of any change in utilization based on a difference between the measured current utilization or power and an expected utilization or power fed back from a previous frequency updating cycle.

6. Power governance circuitry may be the subject-matter of any one of examples 1 to 5 or any other example described herein, wherein when the measurement circuitry detects a change in the utilization or the power, the frequency control circuitry is to update the current operating frequency to a new operating frequency depending on a comparison of the magnitude of the detected change in utilization or power with a respective threshold magnitude.

7. Power governance circuitry may be the subject-matter of any one of examples 1 to 6 or any other example described herein, wherein the frequency control circuitry is to update the current operating frequency to a new operating frequency responsive to a change in a system parameter of the processing platform.

8. Platform governance circuitry may be the subject-matter of any one of examples 1 to 7 or any other example described herein, wherein the frequency control circuitry is to update the current operating frequency to a new operating frequency depending on a change to a power limit allocated to the processing unit, PU, by the processing platform, the PU power limit representing a portion of a system power limit.

9. Power governance circuitry may be the subject-matter of any one of examples 1 to 8 or any other example described herein, wherein the target quantified power expenditure depends on an energy performance preference such that a higher target quantified power expenditure is set when the energy performance preference indicates that performance is to be optimized in preference to power efficiency whilst a relatively lower target quantified power expenditure is set when the energy performance preference indicates that power efficiency is to be optimized in preference to performance.

10. Power governance circuitry may be the subject-matter of any one of examples 1 to 9 or any other example described herein, wherein the frequency control circuitry is to determine the new operating frequency using a power profile for the processing unit, wherein the power profile defines an a priori relationship between a frequency, utilization and a power consumption of the processing unit.

11. Power governance circuitry may be the subject-matter of example 10 or any other example described herein, wherein the new target quantified power expenditure corresponds to a point on an isometric power line of the power profile.

12. Power governance circuitry may be the subject-matter of example 11 or any other example described herein, wherein the frequency control circuitry is to select the new operating frequency based on an intersection of the isometric power line and the application of a scalability line in a load-frequency plane corresponding to the scalability function.

13. Power governance circuitry may be the subject-matter of any one of examples 10 to 12 or any other example described herein, wherein the power profile is generated prior to runtime of the processing unit by at least one of: performing a computer simulation of a model of the processing unit; monitoring operation of the processing unit when executing one or more real processing workloads; and monitoring operation of a processing unit having similar characteristics to the processing unit when executing one or more real processing workloads.

14. Power governance circuitry may be the subject-matter of any one of examples 1 to 13 or any other example described herein, wherein the target quantified power expenditure is quantified in Watts.

15. A processing platform comprising:
two or more processing units may be the subject-matter of any one of examples 1 to 14 or any other example described herein; and
platform power governance circuitry to control an allocation of system power to the plurality of processing units;
wherein the platform power governance circuitry is arranged to receive from each of the processing units a respective new target quantified power expenditure and to control one or more system parameters depending on the received new target quantified power expenditures.

16. Processing platform may be the subject-matter of example 15 or any other example described herein, wherein the platform power governance circuitry is to determine a performance per Watt for the processing platform based on the plurality of received new target quantified power expenditures.

17. Processing platform may be the subject-matter of example 15 or example 16 or any other example described herein, wherein the two or more processing units comprise at least a subset of: a processor core, a multi-core processor, a graphics processing unit and an image processing unit.

18. Processing platform may be the subject-matter of any one of examples 15 to 17 or any other example described herein, wherein at least a subset of the two or more processing units is to receive from the platform power governance circuitry an allocation of a portion of a system power available for use by the processing unit and wherein the frequency control circuitry is of the respective processing unit is to determine the new target quantified power expenditure depending on the allocated portion of the system power.

19. Machine-readable instructions provided on at least one tangible or non-tangible machine-readable medium, the machine-readable instructions, when executed by a processing unit of the processing platform, to cause processing hardware to:

measure a current utilization of the processing unit at a current operating frequency and to determine any change in utilization or power;
update the current operating frequency to a new operating frequency by determining a new target quantified power expenditure to be applied in a subsequent processing cycle depending on the calculated change in utilization or power and to select a new operating frequency to satisfy the new target quantified power based on a scalability function specifying a variation of a given utilization or given power with the operating frequency; and
allocate the new operating frequency to the processing unit.

20. Machine readable instructions may be the subject-matter of example 19 or any other example described herein, comprising an interface module to interface with an operating system of the processing platform to receive from the processing platform at least one platform-controlled power limit to constrain the new target quantified power expenditure.

21. Machine readable instructions may be the subject-matter of example 19 or example 20 or any other example described herein, wherein the interface module is to receive an energy performance preference from the processing platform and wherein the new target quantified power expenditure is determined depending at least in part on the platform energy performance platform.

22. Machine readable instructions may be the subject-matter of any one of examples 19 to 21 or any other example described herein, wherein the interface module is to output to the platform operating system the determined new target quantified power expenditure.

23. A method for controlling a performance level of a processing unit of a processing platform, the method comprising:
measuring a current utilization of the processing unit at a current operating frequency and determining any change in utilization or power;
updating the current operating frequency to a new operating frequency by determining a new target quantified power expenditure to be applied in a subsequent processing cycle depending on the calculated change in utilization or power; and
selecting a new operating frequency to satisfy the new target quantified power based on a scalability function specifying a variation of a given utilization or power with the operating frequency.

24. The method of example 23 or any other example described herein, comprising determining the new target quantified power expenditure based at least in part on feedback corresponding to a discrepancy between the measured current utilization and a value of the new target quantified power expenditure determined in a previous frequency updating cycle.

25. Means for controlling a performance level of a processing unit of a processing platform, the means for controlling comprising:
means for measuring a current utilization of the processing unit at a current operating frequency and calculating a change in utilization or power;
means for updating the current operating frequency to a new operating frequency by determining a new target quantified power expenditure to be applied in a subsequent processing cycle depending on the calculated change in utilization or power; and means for selecting a new operating frequency to satisfy the new target quantified power based on a scalability function specifying a variation of a given utilization or given power with the operating frequency.

26. Means for controlling may be the subject-matter of example 25 or any other example described herein, wherein the means for measuring is to determine the change in utilization based on a difference between the measured current utilization and an expected utilization fed back from a previous frequency updating cycle, the expected utilization having been determined using the scalability function.

The invention claimed is:

1. A processing platform comprising:
 a plurality of processing units (PUs);
 platform power governance circuitry to control an allocation of system power to the plurality of PUs;
 measurement circuitry configured to:
  measure a current utilization of one or more of the plurality of PUs at a current operating frequency using architectural performance counters, and
  determine, based on the measured current utilization using architectural performance counters, a change in utilization or power of the one or more of the plurality of PUs; and
 frequency control circuitry configured to:
  determine, based on the identified change in utilization or power, a new target quantified power expenditure of the one or more of the plurality of PUs,
  identify, based on the new target quantified power expenditure, a new operating frequency for the one or more of the plurality of PUs, and
  update the current operating frequency of the one or more of the plurality of PUs to the new operating frequency,
 wherein the measured current utilization of the one or more of the plurality of PUs at the current operating frequency using architectural performance counters is subject to a time window of performance requested by an operating system.

2. The processing platform of claim 1, wherein the frequency control circuitry is further configured to update the current operating frequency of the one or more of the plurality of PUs to the new operating frequency based on a scaling factor.

3. A method for power management in a processing platform, comprising:
 measuring a current utilization of one or more processing units (PUs) of a plurality of PUs at a current operating frequency using architectural performance counters;
 identifying, based on the measured current utilization using the architectural performance counters, a change in utilization or power of the one or more of the plurality of PUs;
 determining, based on the identified change in utilization or power, a new target quantified power expenditure of the one or more of the plurality of PUs;
 identifying, based on the new target quantified power expenditure, a new operating frequency for the one or more of the plurality of PUs; and
 updating the current operating frequency of the one or more of the plurality of PUs to the new operating frequency,
 wherein the measuring the current utilization of the one or more of the plurality of PUs at the current operating frequency using architectural performance counters is subject to a time window of performance requested by an operating system.

4. The method of claim 3, wherein the updating the current operating frequency of the one or more of the plurality of PUs to the new operating frequency is based on a scaling factor.

* * * * *